(12) United States Patent
McCartie et al.

(10) Patent No.: US 9,462,020 B2
(45) Date of Patent: Oct. 4, 2016

(54) INTELLIGENT CLIENT: MULTIPLE CHANNEL SWITCHING OVER A DIGITAL BROADCAST NETWORK

(75) Inventors: Jonathan Paul McCartie, Los Angeles, CA (US); George Allen Rothrock, San Diego, CA (US); Nicholas Andrew Glassman, Venice, CA (US); David Alan Kosiba, Jamul, CA (US)

(73) Assignee: QUALCOMM Incorporated, San Diego, CA (US)

( * ) Notice: Subject to any disclaimer, the term of this patent is extended or adjusted under 35 U.S.C. 154(b) by 603 days.

(21) Appl. No.: 12/014,929

(22) Filed: Jan. 16, 2008

(65) Prior Publication Data

US 2009/0183205 A1   Jul. 16, 2009

(51) Int. Cl.
*H04H 60/65* (2008.01)
*H04L 29/06* (2006.01)
*H04H 60/46* (2008.01)

(52) U.S. Cl.
CPC .......... *H04L 65/60* (2013.01); *H04H 60/65* (2013.01); *H04H 60/46* (2013.01)

(58) Field of Classification Search
CPC ...... H04H 60/11; H04H 60/13; H04H 60/46; H04H 60/65; H04L 65/60
USPC ............. 455/3.01–3.06, 414.1, 456.1, 456.3; 725/133
See application file for complete search history.

(56) References Cited

U.S. PATENT DOCUMENTS

| | | |
|---|---|---|
| 5,946,326 A | 8/1999 | Rinne |
| 6,839,734 B1 * | 1/2005 | Vega-Garcia et al. ........ 709/204 |
| 7,095,945 B1 * | 8/2006 | Kovacevic ............... H04N 5/76 386/201 |
| 7,457,312 B2 * | 11/2008 | Weiss et al. .................. 370/468 |
| 2002/0092019 A1 | 7/2002 | Marcus |
| 2003/0236912 A1 | 12/2003 | Klemets et al. |
| 2004/0073947 A1 * | 4/2004 | Gupta ........................... 725/134 |
| 2004/0226050 A1 | 11/2004 | Matsuzaki et al. |
| 2005/0015718 A1 | 1/2005 | Sambhus et al. |
| 2005/0071876 A1 * | 3/2005 | van Beek ........................ 725/62 |

(Continued)

FOREIGN PATENT DOCUMENTS

| | | |
|---|---|---|
| CN | 1154187 A | 7/1997 |
| CN | 1350744 A | 5/2002 |

(Continued)

OTHER PUBLICATIONS

International Preliminary Report on Patentability, PCT/US2009/030903, International Preliminary Examining Authority, European Patent Office, May 21, 2010.

(Continued)

*Primary Examiner* — Raymond Dean
(74) *Attorney, Agent, or Firm* — Norton Rose Fulbright US LLP

(57) ABSTRACT

A digital broadcast network is disclosed that can divide an application into multiple channels to be distributed to receiving devices. A receiving device can selectively accept one or more of the multiple channels depending on various criteria including selection parameters and device capability. The selective choice of at least a subset of the application can provide an acceptable depth and delivery of data to improve the user experience. Text and standard data experiences can be combined with an audio counterpart, with pre-loaded client-side media files, and/or with pre-loaded client-side media files and a live audio stream, which can enrich a user experience.

26 Claims, 16 Drawing Sheets

(56) References Cited

U.S. PATENT DOCUMENTS

| | | | |
|---|---|---|---|
| 2005/0083932 A1* | 4/2005 | Lee et al. | 370/390 |
| 2006/0014490 A1 | 1/2006 | Kopra et al. | |
| 2006/0025148 A1* | 2/2006 | Karaoguz et al. | 455/452.2 |
| 2006/0111109 A1* | 5/2006 | Kim | 455/436 |
| 2006/0165388 A1* | 7/2006 | Uesaka et al. | 386/125 |
| 2007/0027932 A1 | 2/2007 | Thibeault | |
| 2007/0192684 A1 | 8/2007 | Bodin et al. | |
| 2008/0057918 A1* | 3/2008 | Abrant et al. | 455/414.1 |
| 2008/0092195 A1* | 4/2008 | Lim | 725/131 |
| 2008/0254833 A1* | 10/2008 | Keevill et al. | 455/558 |
| 2008/0301750 A1* | 12/2008 | Silfvast | H04N 7/17318 725/131 |
| 2010/0033622 A1* | 2/2010 | Bellers et al. | 348/448 |

FOREIGN PATENT DOCUMENTS

| | | |
|---|---|---|
| CN | 1607750 A | 4/2005 |
| CN | 1622658 A | 6/2005 |
| CN | 1883195 A | 12/2006 |
| CN | 101021862 A | 8/2007 |
| GB | 2388739 | 11/2003 |
| JP | 2001516994 A | 10/2001 |
| JP | 2002077076 A | 3/2002 |
| JP | 2003069759 A | 3/2003 |
| JP | 2004350331 A | 12/2004 |
| JP | 2005518120 A | 6/2005 |
| JP | 2006520026 A | 8/2006 |
| JP | 2007336079 A | 12/2007 |
| WO | WO-0056050 A1 | 9/2000 |
| WO | WO03084208 A1 | 10/2003 |
| WO | 2004025953 | 3/2004 |
| WO | WO-2004061608 A2 | 7/2004 |
| WO | WO-2005053338 A1 | 6/2005 |
| WO | WO-2007082190 A2 | 7/2007 |
| WO | WO-2007098425 A1 | 8/2007 |

OTHER PUBLICATIONS

International Search Report, PCT/US2009/030903, International Searching Authority, European Patent Office, Dec. 1, 2009.

Written Opinion, PCT/US2009/030903, International Searching Authority, European Patent Office, Dec. 1, 2009.

Luby, et al., "Flute-File Delivery over Unidirectional Transport", IETF RFC 3926, Oct. 2004, pp. 1-35.

* cited by examiner

INTELLIGENT CLIENT: MULTIPLE CHANNEL SWITCHING OVER A DIGITAL BROADCAST NETWORK

BACKGROUND

1. Field

The following description relates generally to content distribution systems and more particularly to selective distribution and selective presentation of content.

2. Background

A digital broadcast network is a one-way delivery method to client-side software located on a user device. Datacast services provide information over a digital broadcast network to be used by the client-side software. Traditional digital broadcast networks can include bandwidth limitations that can affect the depth and sophistication of a user experience offered by many datacast services. Some attempts at data applications over digital broadcast networks assumed a single channel to be associated with a single datacast service.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

The delivery method of the data is similar to that used by traditional linear services such as video and audio signals. Subsequently, all information is provided in a "first to last" stream that materially influences the timeliness of the user-experience. As the experiences become more complicated, the amount of data to be broadcast increases and thus the "first-to-last" method slows delivery and materially affects the quality and depth of the user experience offered by the datacast service. Additionally, since a single channel cannot efficiently deliver mass amounts of data over a digital broadcast network, the application must display all its data without the user's ability to request specific information.

A "data-only" experience that broadcasts only text and numbers provides a rich experience for the user, yet is limited in its very nature. This system requires the user to be actively viewing the device in order to have any experience with the services. A text-only and/or broadcast-only datacast system severely limits the types of experiences that can be obtained over a digital broadcast network.

Another problem associated with the depth and sophistication of the user experience is that during platform launch, there is no return path included that would allow the client software to provide feedback to the broadcaster. Subsequently, collecting user activity can be extremely difficult, and, therefore, cannot be achieved in a timely enough manner to facilitate immediate use. There are two results of this inability to enter a feedback loop with users. The first is the difficulty of creating any type of community based upon shared experience between consumers. Although consumers will share experiences, the challenge is how to highlight their awareness in order to build a sense of community. The second effect is that the lack of feedback precludes personalizing the experience for users.

In accordance with one or more embodiments and corresponding disclosure thereof, various aspects are described in connection with providing client software functionality that allows for intelligently tuning to separate broadcast channels in order to assimilate data efficiently to provide an acceptable depth and delivery of the user experience. In another aspect, provided is the concentration and personalization of the consumer's experience as well as providing an entry point for encouraging the consumer to feel a part of a larger community. In accordance with some aspects, text and standard data experiences can be combined with an audio counterpart, with pre-loaded client-side media files, and/or with pre-loaded client-side media files and a live audio stream, which can enrich the user experience.

According to an aspect is a method for rendering content. The method includes identifying a plurality of channels that include respective sets of content. A subset of the channels can be aggregated to render a set of aggregated or parsed content. Identifying the channels can include detecting a tag associated with each of the plurality of channels. The tag can include information relating to a content of each of the plurality of channels.

In accordance with another aspect is a device for rendering content. The device includes a computer platform having a memory and a processor and a user interface in communication with the computer platform. The memory can include a selection parameter. Also included is a channel identifier that identifies a plurality of channels that include respective sets of content. An aggregation component is also provided that aggregates a subset of the plurality of channels to render a set of aggregated or parsed content.

Still another aspect relates to an apparatus for selectively rendering at least a subset of content. The apparatus includes a means for identifying a plurality of channels that include respective sets of content and a means for aggregating a subset of the channels to render a set of aggregated or parsed content. The means for identifying a plurality of channels can further detect a tag associated with each of the plurality of channels. The tag can include information relating to a content of each of the plurality of channels.

In a related aspect is a machine-readable medium having stored thereon machine-executable instructions for identifying a plurality of channels that include respective sets of content. Each of the plurality of channels can be associated with an identifier. The machine-executable instructions are also for aggregating a subset of the channels to render a set of aggregated or parsed content.

In a wireless communication system, another aspect relates to an apparatus that includes a processor. The processor is configured to identify a plurality of channels that include respective sets of content and accept at least a subset of the channels based on the identifier and at least one of a selection parameter, a location, available resources, or combinations thereof. The processor can also be configured to aggregate the subset of channels to render a set of aggregated or parsed content.

In a related aspect is a method for providing content. The method includes parsing a set of data associated with a single user application into multiple streams. The method can further include tagging the respective streams with information to identify content categories within each stream. Each of the multiple streams can be transmitted at substantially the same time to one or more receiving devices.

Another aspect relates to a wireless communications apparatus that includes a computer platform having a memory and a processor. The memory can store information related to decisions made by the processor. The apparatus also includes a parser that divides an application into multiple channels and a labeler that tags each channel with information to identify content within each channel.

In accordance with another aspect is an apparatus for selectively providing multiple streams of content. The apparatus includes a means for parsing a set of data into multiple streams and a means for tagging the respective streams with information to identify content within each stream. Also included can be a means for transmitting each of the multiple streams at substantially the same time or shifting the transmission timing of at least one stream based on a transmission speed.

Still another aspect relates to a machine-readable medium having stored thereon machine-executable instructions for dividing an application into multiple channels and tagging each channel with information to identify content within each channel. The instructions can further comprise sending each of the multiple channels at substantially the same time.

In a wireless communication system another aspect relates to an apparatus that includes a processor. The processor can be configured to parse a set of data into multiple streams and tag the respective streams with information to identify content within each stream. The processor can further be configured to transmit each of the multiple streams at substantially the same time to or at different times.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
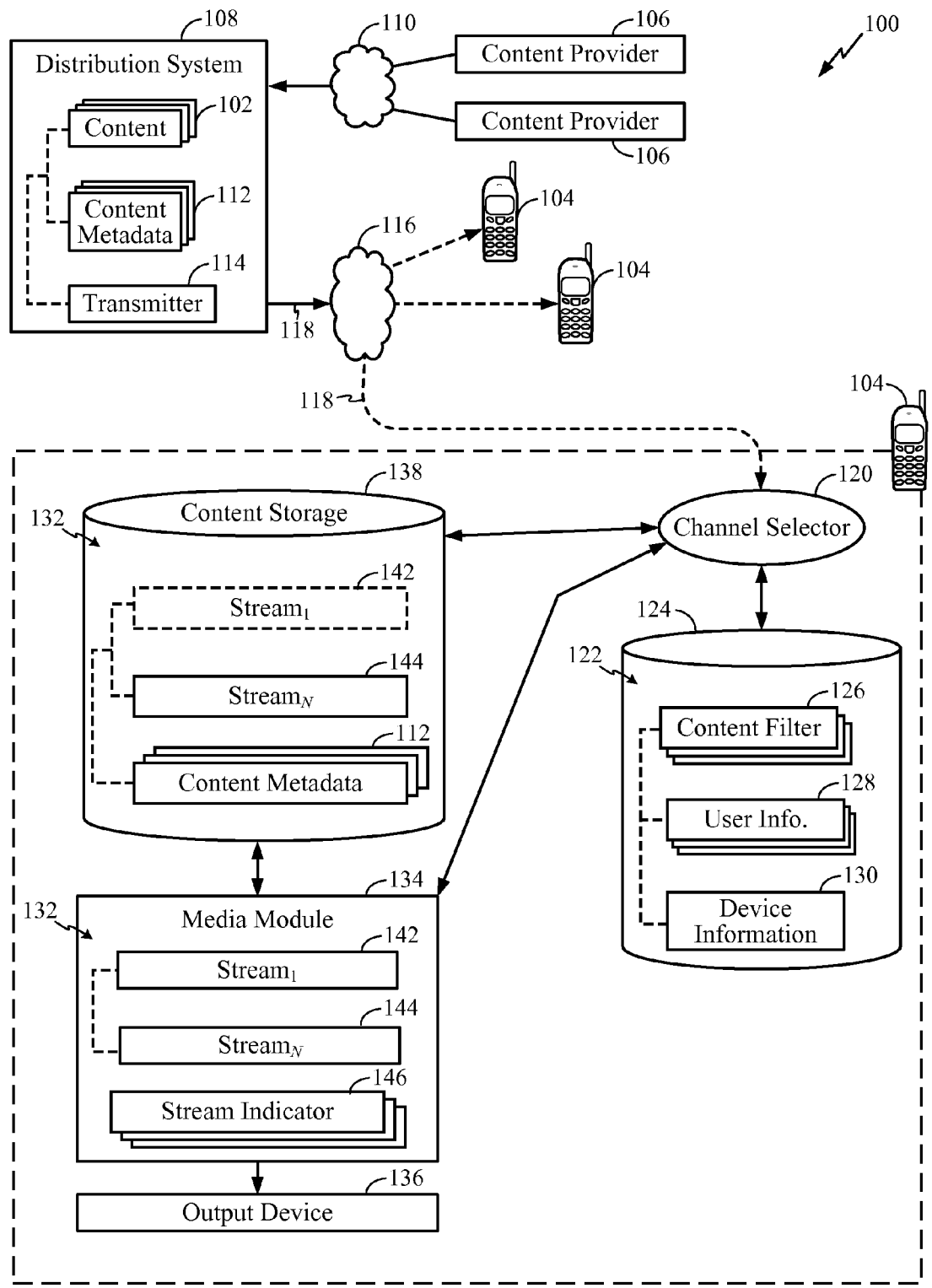
FIG. 1 illustrates a system that enables selective downloading and selective presentation of content on one or more wireless devices.

Various embodiments are now described with reference to the drawings. In the following description, for purposes of explanation, numerous specific details are set forth in order to provide a thorough understanding of one or more aspects. It may be evident, however, that such aspects(s) may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules and/or may not include all of the devices, components, modules discussed in connection with the figures. A combination of these approaches may also be used.

Referring to FIG. 1, illustrated is a system 100 that enables selective downloading and selective presentation of content 102 on one or more wireless devices 104. System 100 may include one or more content providers 106 operable to provide one more pieces of content 102 to distribution system 108, such as through a first network 110. Distribution system 108 is operable to deliver one or more streams of content 102, along with one or more content metadata 112 associated with each stream of content 102, to the one or more wireless devices 104. Such content can be delivered as individual streams of data, wherein a complete content set can include multiple streams of data (e.g., a single application is divided into multiple streams). For example, distribution system 108 may include a transmitter 114 and/or the second network 116, wherein transmitter 114 is operable to generate a one-to-many transmission 118 of content 102 and/or content metadata 112 for delivery to one or more wireless devices 104 through second network 116. In accordance with one aspect, the content 102 and/or content metadata 112 can be divided or partioned into multiple streams or multiple channels and one or more of the channels can be selectively received and combined (if more than one is selected) for presentation at a respective wireless device 104.

Upon accessing transmission 118, each wireless device 104 is operable to execute a channel selector 120, which can be configured to determine selected ones of the one or more channels of content 102 in transmission 118 to download to wireless device 104 based on one or more selection parameters 122 within a selection database 124. Selection parameters 122 may include, but are not limited to, data such as one or more content filters 126 (e.g., relevant information contained in a stream), one or more data representing user information 128 (e.g. preferences, state, time of day/day of week), and/or one or more data representing device information 130 (e.g., capabilities, limitations, display size, audio functionality). Selection parameters 122 can be unique to, and/or customized for, each respective wireless device 104 and/or each respective user of each wireless device 104. As such, in some aspects, each wireless device 104 may download a different set of one or more streams of content 102 within the same transmission 118. Thus, in some aspects, the one or more selection parameters 122 allow channel selector 120 to download one or more selected streams of content 132 of interest to a respective user of the respective wireless device 104 based on a match between one or more of the respective content metadata 112 and one or more of the selection parameters 122.

Further, for example, in aspects where selected content 132 comprises a real time or live content, channel selector 120 may forward selected content 132 to a media module 134 for presentation through an output device 136. In other aspects, for example, where selected content 132 comprises a non-real-time content, channel selector 120 may forward selected content 132 to be cached or saved in a content storage 138. In the non-real-time case, media module 134 is operable to access content storage 138 at any time to retrieve and cause a presentation through output device 136 of the selected content 132.

Output device 136, in combination with media module 134, is operable to generate selected content 132 as a program or presentation for consumption by a user of wireless device 104. Each program or presentation may comprise a combination of one or more streams of selected content 132 (labeled $Stream_1$ 142 through $Stream_N$ 144, where N is an integer) or might comprise a single stream of content. The streams of content 142, 144 can be associated with one more of the content metadata 112 corresponding to each stream 142, 144. Further, for example, in some aspects, one or more streams 142, 144 of a respective program or presentation may include one or more associated stream indicator 146, each of which define a corresponding stream of content. Thus, each stream 142, 144 can provide a reference or association to a corresponding stream (e.g., an audio stream identifies its corresponding video stream). Providing reference information for a corresponding stream allows channel selector 120 to choose streams that are appropriate and which can enrich the user experience.

For example, three types of information (A, B, and C) are to be transmitted for consumption on a user device 104. Each information type can be associated with its own data stream such that a first stream of content can include information "A", a second stream of content includes information "B", a third stream of content includes information "C", and so forth. A user might only want to be presented with information "C", although the user can receive any or all of the information (A, B, and C). Channel selector 120 can distinguish among the different streams based on information included in or associated with a particular stream (e.g., tag, indicator, metadata) and only the desired stream (C in this example) can be selectively presented. Sending different streams for each type of information allows the user though a respective user device 104 to selectively receive only the desired content. In the above example, if the information (A, B, and C) was sent as a single first-to-last stream, a user would have to wait until information "A" and information "B" is complete before receiving the desired information "C". Thus, the disclosed aspects, allow for a richer user experience that can be tailored to the needs or interests of each user. Likewise, only presenting data of relevance to the user can conserve resources, such as saving battery power. If the user decides that information "A" and/or "B" is now desired, the newly selected information can be presented to the user since each stream is transmitted individually and at substantially the same time. However, the user device 104 is only tuning in and receiving the data that the user desires (e.g., based on selection parameters 122).

Thus, system 100 provides each wireless device 104 the ability to independently choose and combine one or more streams of selected content 132 from the one-to-many transmission 118 of a multitude of content 102 based on independently configured content caching functionality associated with each wireless device 104. Further, system 100 can provide each wireless device 104 the ability to independently choose and combine one or more streams of content from among its respective set of one or more streams of selected content 132 for inclusion with another stream of selected content, based on independently configured content insertion functionality associated with each wireless device 104.

In accordance with some aspects, first network 110 and second network 116 provide respective communication links between the various components and/or entities of system 100. In some aspects, first network 110 and second network 116 may comprise independent networks, while in other aspects they may comprise inter-related networks. Generally, first network 110 and second network 116 each may comprise any one or any combination of one or more data networks and/or one or more communications networks. For example, in some aspects, first network 110 may comprise a public communications network, such as the Internet, and second network 116 may comprise a subscription based one-to-many network, such as a multicast network such as a Forward Link Only (FLO) network, including the Media-FLO™ System available from QUALCOMM Incorporated of San Diego, Calif. In other aspects, first network 110 and second network 116 may include one or a combination of other networks, such as: a digital video broadcasting (DVB) network, such as DVB-S for satellite, DVB-C for cable, DVB-T for terrestrial television, DVB-H for terrestrial television for handhelds; a terrestrial telephone network; a satellite telephone network; an infrared network such as an Infrared Data Association (IrDA)-based network; a short-range wireless network; a Bluetooth® technology network; a ZigBee® protocol network; an ultra wide band (UWB) protocol network; a home radio frequency (HomeRF) network; a shared wireless access protocol (SWAP) network; a wideband network, such as a wireless Ethernet compatibility alliance (WECA) network, a wireless fidelity alliance (Wi-Fi Alliance) network, and a 802.11 network; a public switched telephone network; a public heterogeneous communications network, such as the Internet; a private communications network; and land mobile radio network.

Further, examples of telephone networks that may be included in some aspects of first network 110 and/or second network 116 include one, or any combination, of analog and digital networks/technologies, such as: code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Figure 2:
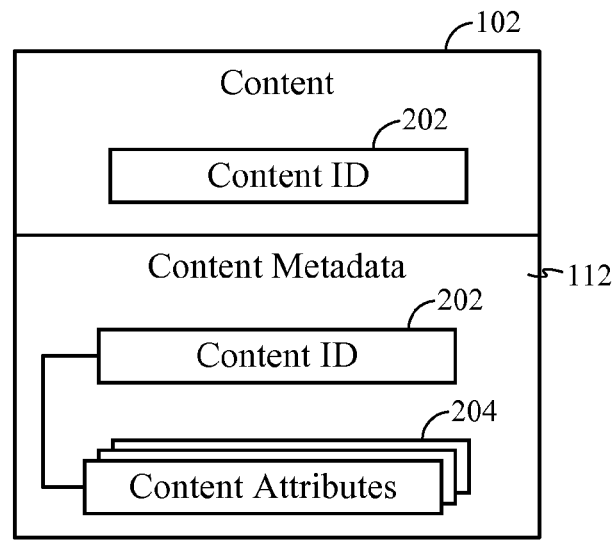
FIG. 2 illustrates a schematic diagram of an aspect of the content of FIG. 1.

Referring to FIG. 2, illustrated is a schematic diagram of an aspect of the content of FIG. 1. Content 102 as used herein may comprise, but is not limited to, at least one of video, audio, multimedia content, real-time content, non-real-time content also referred to as "clips," scripts, programs, or any other type of data or object operable to be distributed to and executed or presented by wireless device 104. For example, content 102 may include one or any combination of subscribed to programming, ad hoc and/or on-demand received programming, and/or advertising or any other form of content added to, inserted within and/or presented simultaneously with or in place of other content. Additionally, for example, content 102 may comprise, but is not limited to, a television show, a video, a movie, a song, interactive data such as World Wide Web pages and links, etc. Further, content 102 may comprise a unique content identifier (ID) 202, such as one or any combination of a letter, a number, a name, a file name, a file path, etc. associated with the respective piece of content.

Additionally, at least one of the multitude of content 102 is associated with one or more content metadata 112. For instance, one or more of the "content suppliers" associated with a respective one of the multitude of content 102 may define the respective content metadata 112, and associate the content metadata 112 with the respective content. As used herein, the term "content supplier" may include one or any combination of a content provider such as content provider 106, a content retailer, a billing and customer service provider, and a media distributor such as distribution system 108. Content metadata 112 comprises any data that describes and/or is associated with each respective piece of content 102. For example, content metadata 112 may comprise, but is not limited to, one or any combination of content ID 202 and one or more content attributes 204, such as a category, a name, a content length, a content type, associated stream indicator 146, a code, an identifier, a theme, a genre, an intended audience and/or market, a script, a content filter identifier, a cuing protocol parameter, a related audience and/or market, and/or any metadata relating to the corresponding content. One or more content metadata 112 may be separate from, attached to or embedded within the respective content 102. In some aspects, for example, when content 102 and content metadata 112 are separate, they each may comprise or point to the same content ID 202, for example, to enable the respective content metadata to be related to the respective content.

Figure 3:
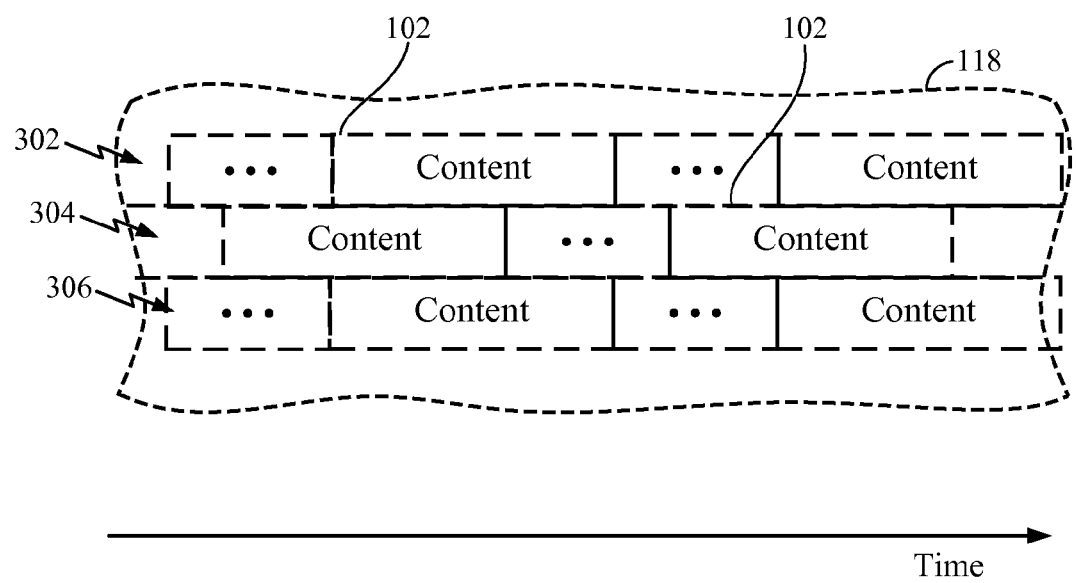
FIG. 3 illustrates a schematic diagram of an aspect of the transmission of a multitude of streams of the multitude of content of FIG. 1.

Referring to FIG. 3, illustrated is a schematic diagram of an aspect of the transmission of a multitude of streams of the multitude of content of FIG. 1. Transmission 118 may provide multiple streams or channels 302, 304, 306 of content 102 to each wireless device 104 (FIG. 1) for consumption by a respective end user. In some aspects, for example, each transmission 118 may comprise a one-to-many transmission in a Forward Link Only (FLO™) system, such as the MediaFLO™ system available from QUALCOMM Incorporated of San Diego, Calif. In such a system, transmission 118 comprises a flow or a logical stream within a "multiplex," which is a set of flows available in a given geographical area. Further, each stream 302, 304, 306 carried by transmission 118 may comprise one or some combination of the plurality of content 102. Thus, transmission 118 is able to deliver an entire content 102 utilizing multiple streams 302, 304, 306 at substantially the same time to allow a recipient of the multiple streams 302, 304, 306 to combine one or more of the streams for rendering on a user device.

Figure 4:
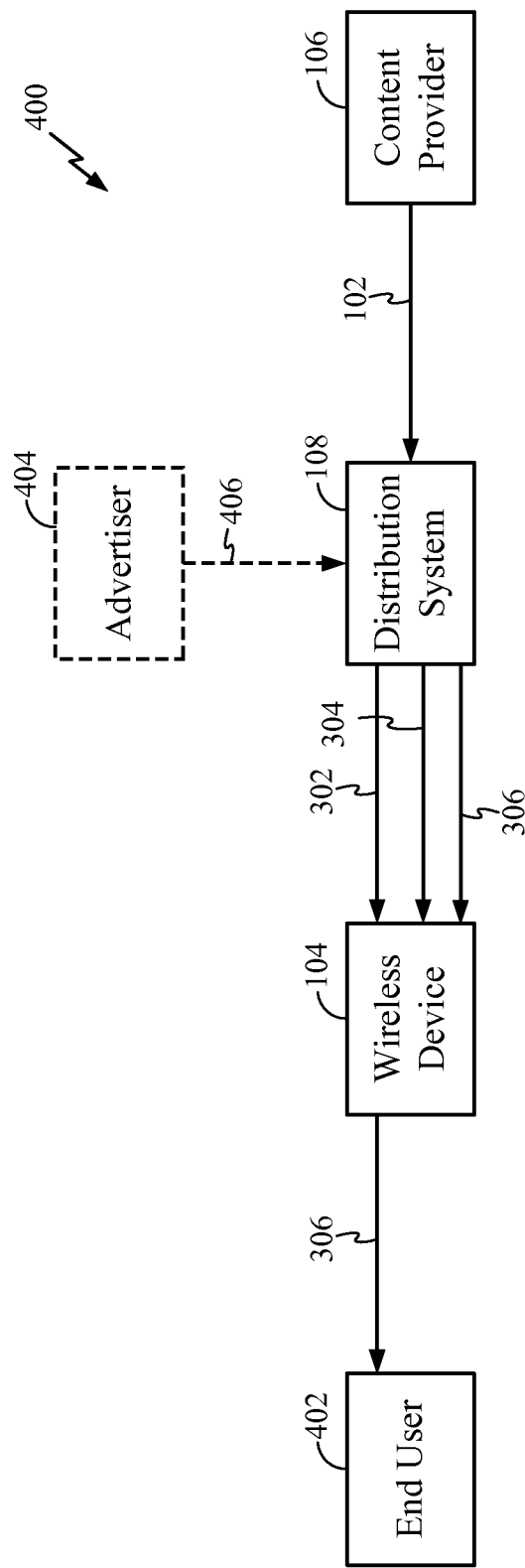
FIG. 4 illustrates a schematic diagram of an aspect of components, including an advertiser, of the system of FIG. 1.

Referring to FIG. 4, illustrated is a schematic diagram of an aspect of components, including an advertiser, of the system of FIG. 1. In some aspects, because the presentation of each stream 302, 304, 306 carried by transmission 118 may attract a large number of end users or consumers 402, system 100 may further include one or more advertisers 404 in communication with distribution system 108. Advertiser 404 comprises an entity desiring to present one more pieces of content 102 (FIG. 1) within a stream 406, in the form of one or more advertisements to selected end users 402. For example, in this aspect, a first stream 302 may comprise, but is not limited to, a video feed and a second stream 304 can comprise an audio stream and a third stream 306 may comprise, but is not limited to, an advertisement. One or more of the streams 302, 304, 306 can be presented to the end user 402, such as the third stream 306 comprising the advertisement. Although the other streams 302 and 304 can be received by the end user 402, such streams can be selectively ignored or disregarded if the streams do not conform to parameters associated with streams that should be relayed to the end user 402.

Figure 5:
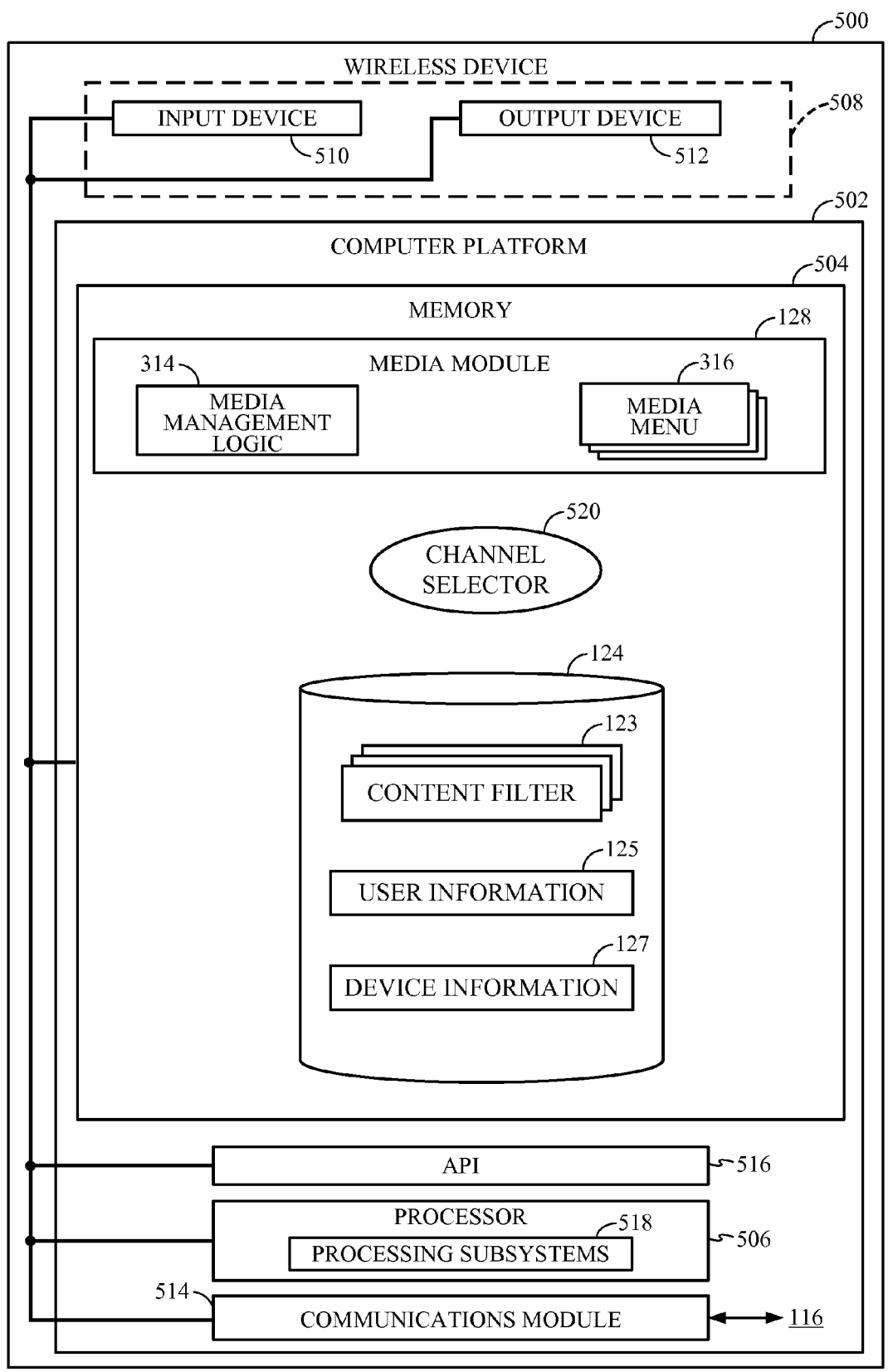
FIG. 5 illustrates a wireless device in accordance with the disclosed aspects.

FIG. 5 illustrates a wireless device 500 in accordance with the disclosed aspects. Wireless device 500 represents wireless device 104 of system 100 (FIG. 1) and is operable to access second network 116 in order to receive transmission 118 and/or to communicate with distribution system 108. Each wireless device 500 may comprise a computer platform 502 having a memory 504 operable to store data, logic and applications executable by a processor 506. A user may interact with wireless device 500 and its resident applications through one or more user interfaces 508, which may include one or more input devices 510 and one or more output devices 512. Additionally, wireless device 500 may exchange communications with external devices and/or networks through a communications module 514.

It should be noted that although wireless devices 500 may be illustrated as cellular telephones, any number and combination of types of wireless devices 500 may be included in system 100 of FIG. 1. For example, wireless device 500 may include, but is not limited to, a cellular telephone, a Personal Digital Assistant (PDA) a laptop computer, a two-way pager, a portable gaming device, a portable music device, or any type of computerized, wireless device. The disclosed aspects can accordingly be performed on any form of wireless device or computer module, including a wired or wireless communication portal, including without limitation, wireless modems, PCMCIA cards, access terminals, personal computers, telephones, or any combination or sub-combination thereof.

Computer platform 502 is operable to transmit data across a network, such as first network 110 (FIG. 1) and/or second network 116 (FIG. 1), and is operable to receive and execute routines and applications and optionally display data generated within wireless device 500 or received from any network device or other computer device connected to the network or connected to wireless device 500. Computer platform 502 may be embodied in, for example, one or any combination of hardware, firmware, software, data and executable instructions.

Memory 504 may comprise one or any combination of volatile and nonvolatile memory, such as read-only and/or random-access memory (RAM and ROM), EPROM, EEPROM, flash cards, flash memory cells, an electronic file system, and any memory common to computer platforms. Further, memory 504 may include one or more of any secondary or tertiary storage device, such as magnetic media, optical media, tape, or soft or hard disk, including removable memory mechanisms.

Further, processor 502 may be one or more of an application-specific integrated circuit ("ASIC"), a chipset, a processor, a logic circuit, and any other data processing device. In some aspects, processor 504, or other processor such as an ASIC, may execute an application programming interface (API) layer 516 that interfaces with any resident programs stored in memory 504 of wireless device 500. API 516 is typically a runtime environment executing on the respective wireless device. One such runtime environment is Binary Runtime Environment for Wireless® (BREW®) software developed by QUALCOMM Incorporated, of San Diego, Calif. Other runtime environments may be utilized that, for example, operate to control the execution of applications on wireless computing devices.

Additionally, processor 502 may include various processing subsystems 518 embodied in hardware, firmware, software, data, executable instructions and combinations thereof, which enable the functionality of wireless device 500 and the operability of wireless device on network 116 of FIG. 1. For example, processing subsystems 518 allow for initiating and maintaining communications, and exchanging data, with distribution system 108 and/or other networked devices. In aspects in which the wireless device 500 is defined as a cellular telephone, for example, processor 506 may additionally include one or a combination of processing subsystems 518, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, vocoder, messaging, graphics, USB, multimedia, etc. For the disclosed aspects, processing subsystems 518 of processor 506 may include any subsystem components that interact with applications executing on computer platform 502 that enable the functionality described herein. For example, processing subsystems 518 may include any subsystem components that receive data reads and data writes from API 516 on behalf of channel selector 520.

Further, communications module 514 may be embodied in hardware, firmware, software, data, executable instructions and combinations thereof, and is operable to enable communications among the various components of wireless device 500, as well as between wireless device 104 and first network 110 and/or second network 116. For example, in cellular telephone aspects, communication module 514 may include the requisite hardware, firmware, software, data, executable instructions and combinations thereof, including transmit and receive chain components for establishing a wireless communication connection.

Further, for example, communication module 514 is operable to receive the plurality of content 102 and the associated respective one or more content metadata 112, if any, from distribution system 108 and forward them to channel selector 520 or provide channel selector 520 with access to them. Similarly, for example, communication module 514 is operable to receive the one or more selection parameters 122 and either forward them to channel selector 520 or provide channel selector 520 with access to them. Subsequently, for example, communications module 514 is operable to forward selected content 126, respectively, to other device components for further processing.

Additionally, one or more input devices 510 for generating inputs into wireless device, and one or more output devices 512 for generating information for consumption by the user of the wireless device are provided. For example, input device 510 may include a mechanism such as a key or keyboard, a navigation mechanism, a mouse, a touch-screen display, a microphone in association with a voice recognition module, etc. In certain aspects, input device 510 provides an interface for receiving user input, such as to activate or interact with an application or module on the wireless device. Further, for example, output device 512 may include a display, an audio speaker, a haptic feedback mechanism, etc. Further, user interface 508 may comprise one or any combination of input devices 510 and/or output devices 512.

Figure 6:
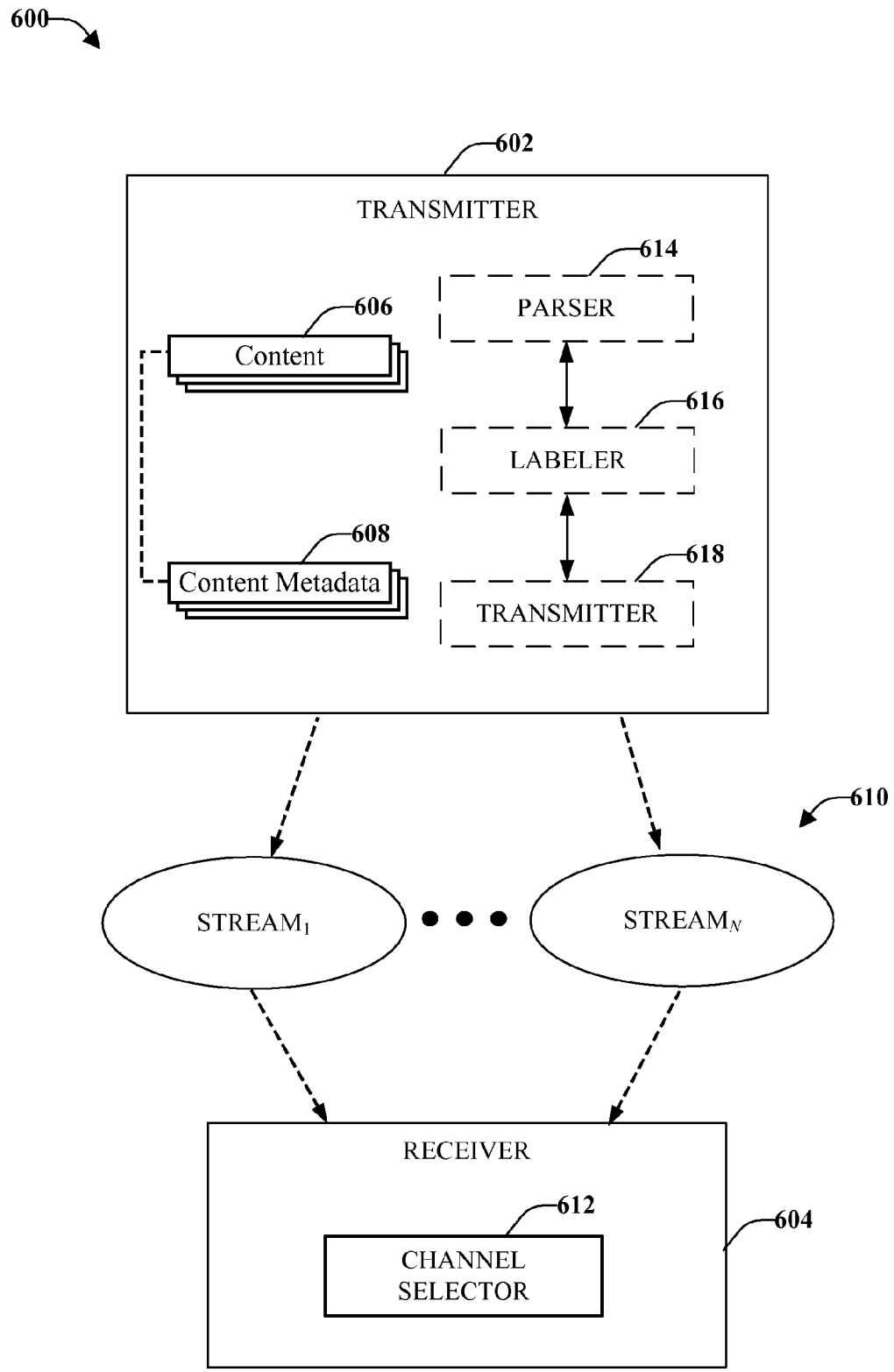
FIG. 6 illustrates a block diagram of an example system for providing content over multiple channels.

With reference now to FIG. 6, illustrated is a block diagram of an example system 600 for providing content over multiple channels. The amount of data, especially digital data, transmitted to and among wireless devices has increased exponentially over time. As such, a single channel is no longer adequate to properly convey or transmit all the data. Thus, system 600 can provide custom data in a one-way broadcast system. Additionally, in some circumstances, a user does not want to receive all the data, but only a subset thereof. System 600 can facilitate parsing the data into multiple streams or channels and transmitting the data in such a manner that one or more of the streams of data can be selectively combined and rendered on a user device, providing other saving benefits.

In further detail, system 600 includes a transmitter 602 (similar to distribution system 108 of FIG. 1) and a receiver 604 (similar to device 104 of FIG. 1). Transmitter 602 can be configured to broadcast content 606 and associated content metadata 608, if any, to receiver 604. Transmitter 602 can be configured to divide the content 606 and associated content metadata 608 into multiple streams or channels, labeled $Stream_1$ through $Stream_N$, where N is an integer, and referred to collectively as multiple streams 610. The multiple streams 610 are subsets of data for a single application that is broken up into individual streams, which can be selectively combined at a receiving device. The multiple streams 610 can be transmitted at substantially the same time to receiver 604. In accordance with some aspects, transmitter 602 can also send multiple streams 610 that relate to different applications (e.g., a first set of streams relate to a first application, a second set of streams relate to a second application, and so forth).

Receiver 604 can include a channel selector 612 that can be configured to selectively accept and combine one or more of the multiple streams 610 to be rendered on a user device. In accordance with some aspects, receiver 604 can take data from all of the streams 610 that are received in parallel. Selectively accepting, combining, and rendering at least a subset of the multiple streams 610 can enhance a user experience, such as by accepting and rendering only information desired by the user (e.g., information not desired is not one of the streams of data selected), obtaining and rendering selected data more quickly, receiving and presenting advertisements of interest to a user, and so forth.

In order to facilitate dividing information into different channels or streams, transmitter 602 can include a parser 614 that can be configured to divide a set of data or content 606 into multiple streams (or channels) 610. The content 606 can be divided into streams corresponding to the type of content (e.g., video, audio, high-definition video, text, and so on) and/or the content information (e.g., statistics, sporting event scores, stock prices, and so forth). Such dividing can be performed in a predetermined manner, based on information included in the communication, and or other factors. For example, a sports application can have a multitude of sports and there can be different streams for the scores corresponding to the number of sports, thus, if there are thirteen different sports there are thirteen different streams for the scores. There can also be another set of streams for statistical information, fantasy team information, player information, and any other information that would be of interest to a user. It should be understood that while although the various aspects and features are described herein with reference to sports, there is a multitude of other applications, including but not limited to, stock prices, real estate transactions, vehicles, television programs, and so on.

Also included in transmitter 602 can be a labeler 616 that can be configured to tag or provide an indicator associated with the content included in each stream. The tag or indicator can include content metadata 608 and can be any type of indicator that can be utilized by receiver 604 to identify content associated with each respective stream. Thus, multiple channels can be linked to a stream based on a tag or other indicator that identifies the content included in each stream, which can include multiple tagged channels. For example, the tag or metadata 608 might indicate the content type, the content information, or other information (e.g., associated streams or channels, importance, and so forth) that can be utilized by receiver 604 and/or channel selector 612 in order to selectively accept or deny a particular stream.

The multiple data streams 610 can be transmitted by transmitter 616 so that receivers within the vicinity can receive and selectively accept and combine one or more of the multiple data steams 610. The multiple data streams 610 can be transmitted at substantially the same time in order for receiver 604 to selectively identify and accept one or more of the streams and combine streams if two or more are selected by channel selector 612. Thus, transmitter 602 can convey the multiple streams as a parallel transmission rather than a serial transmission. For example, a serial transmission (e.g., all data sent as a single stream) can have a bandwidth that is equal to the sum of the bandwidth of the multiple streams, thus, the total bandwidth remains the same. Therefore, system 600 can provide multiple streams of data that does not increase the bandwidth but can allow receiver 604 to obtain the content desired by an application, which is associated with one or more stream more quickly.

In accordance with some aspects, the transmitter of streams for a particular application can be slightly offset to account for the type of information being delivered, the time needed for transmission, and other factors so that the information arrives at receiver 604 in a manner that can enrich a user experience.

Figure 7:
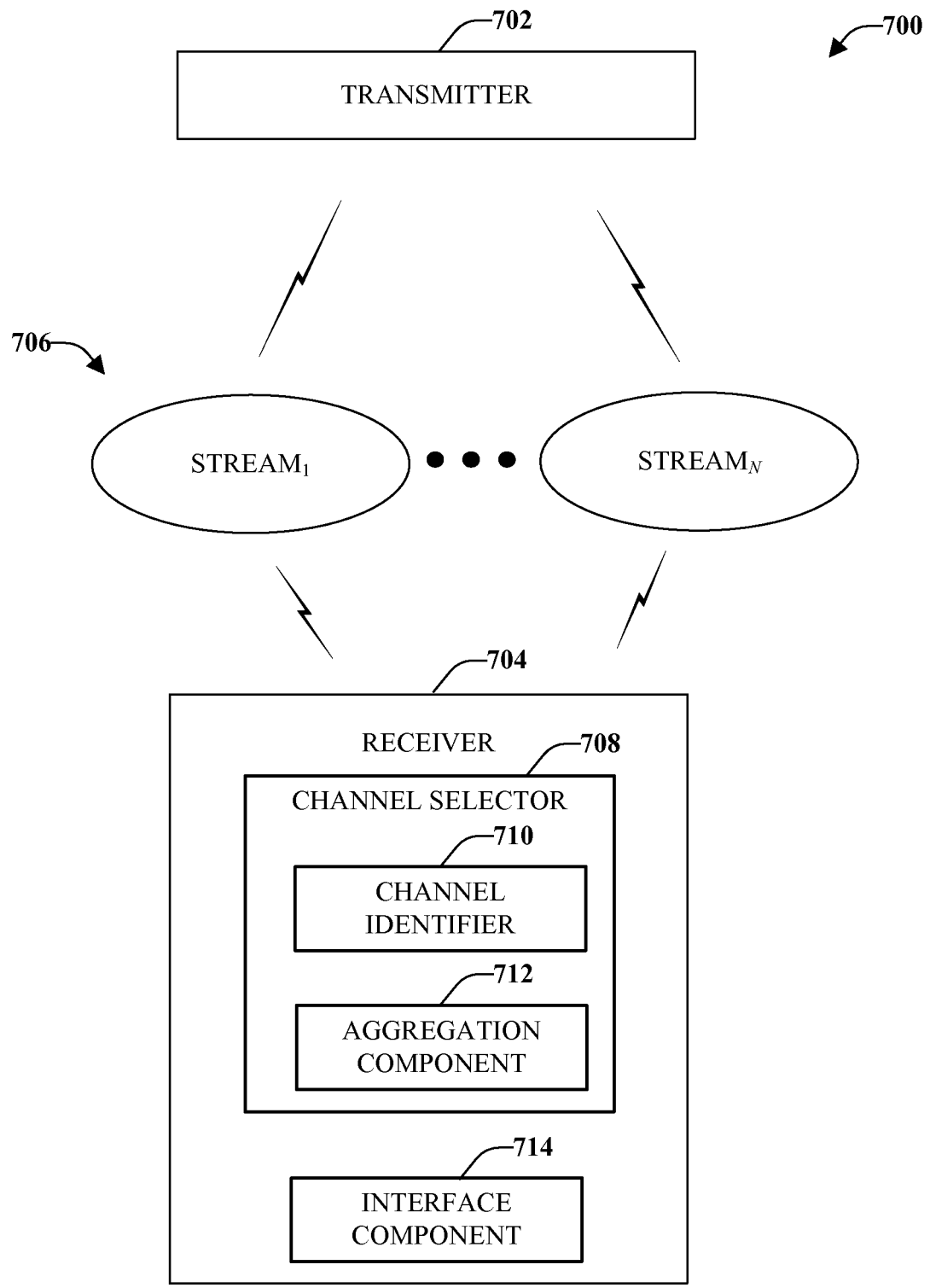
FIG. 7 illustrates an example system that facilitates selectively combining one or more streams of data.

FIG. 7 illustrates an example system 700 that facilitates selectively combining one or more streams of data. When data is sent as a single stream of information, there might be a tremendous amount of data that is not of interest to a user. System 700 can facilitate parsing a single application into components, represented as multiple streams, and transmitting each of the multiple streams at substantially the same time so that a recipient can selectively combine one or more of the streams. The multiple streams can allow a user, through a respective user device, to receive only information that is relevant and/or of interest to the user, which can provide a robust user experience and provides power saving benefits. Each component (e.g., stream) can be combined with one or more other components, if desired. Thus, a receiving device can reconstruct the entire single application or sub-portions thereof.

System 700 includes at least one transmitter 702 and at least one receiver 704. Transmitter 702 can be configured to divide or parse data into multiple streams in a predetermined manner and additionally include information within each of the multiple streams that identifies the type of data, information contained therein, information relating to associated streams and/or other information that can be used by receiver 704 to determine whether to accept (and combine) or ignore a particular stream. As illustrated, transmitter 702 can send multiple streams, labeled $Stream_1$ through $Stream_N$, where N is an integer. The multiple streams are referred to collectively as streams 706.

Receiver 704 includes a channel selector 708 that can be configured to selectively accept one or more streams 706. Channel selector 708 can facilitate receipt of data in such a manner that the amount of data delivery and the type of data that a user desires at any given point in time is optimized, as well as minimize power consumption by the data reception hardware. Channel selector 708 can further be configured to allow the user to create a desired experience in real-time.

Associated with channel selector 708 can be channel identifier 710 that can be configured to recognize or distinguish between the multiple streams 706 that are arriving at receiver 704. For example, channel identifier 710 can recognize each stream based in part on information included within the stream or associated with the stream. Such information can identify the information contained within the stream, the type of information contained within the stream, as well as other criteria (e.g., associated streams, importance of the information, and so forth).

An aggregation component 712 can be configured to selectively combine one or more of the data streams based on information, such as policies, rules, user preferences, user state, and so forth. Thus, depending on various criteria (e.g., time of day, user state, and so on) different streams might be accepted based on external data. For example, a stream may be stored into memory by reference to the time of day a user might desire a particular type of information (e.g., in the morning the user might only want news delivered in an audio stream, at night the user would like both audio and video). In another example, a stream is stored in memory by reference to the state of the user, such as that relating to the activity currently being performed by the user (e.g., if the user is operating a vehicle any streams containing video or text is not desired, thus, only audio streams would be accepted and presented to the user). In this implementation, the user can provide information relating to a user state, such as through an interface component or other selection means. In accordance with some aspects, the receiver 704 can be configured to infer the user state. Thus, depending on the client application, the user and/or intrinsic/extrinsic data, aggregation component 712 can selectively combine or parse one or more streams of data, which can be rendered (e.g., display, produce audio, and so forth) by interface component 714.

In accordance with some aspects, aggregation component 712 can be configured to select the data stream based on information desired to be received by the user. For example, transmitter 702 might send a first information stream that includes "A" information, a second information stream that includes "B" information, and a third information stream that includes "C" information, however, the user only desires to receive the "C" information. Channel identifier 710 can recognize the data stream that includes the "C" information, which can be selectively chosen by aggregation component 712. Thus, rather than accepting all three streams of information, receiver 704 can simply choose the single data stream that is of interest to the user, which can be presented by interface component 714. In such a manner, undesired information can be ignored and a richer user experience provided since the user does not have to wait for the undesired information (e.g., "A" and "B" in the above example) that might have been transmitted in a first-to-last data stream. Thus, system 700 provides user experiences and power saving advantages as well as other advantages.

Figure 8:
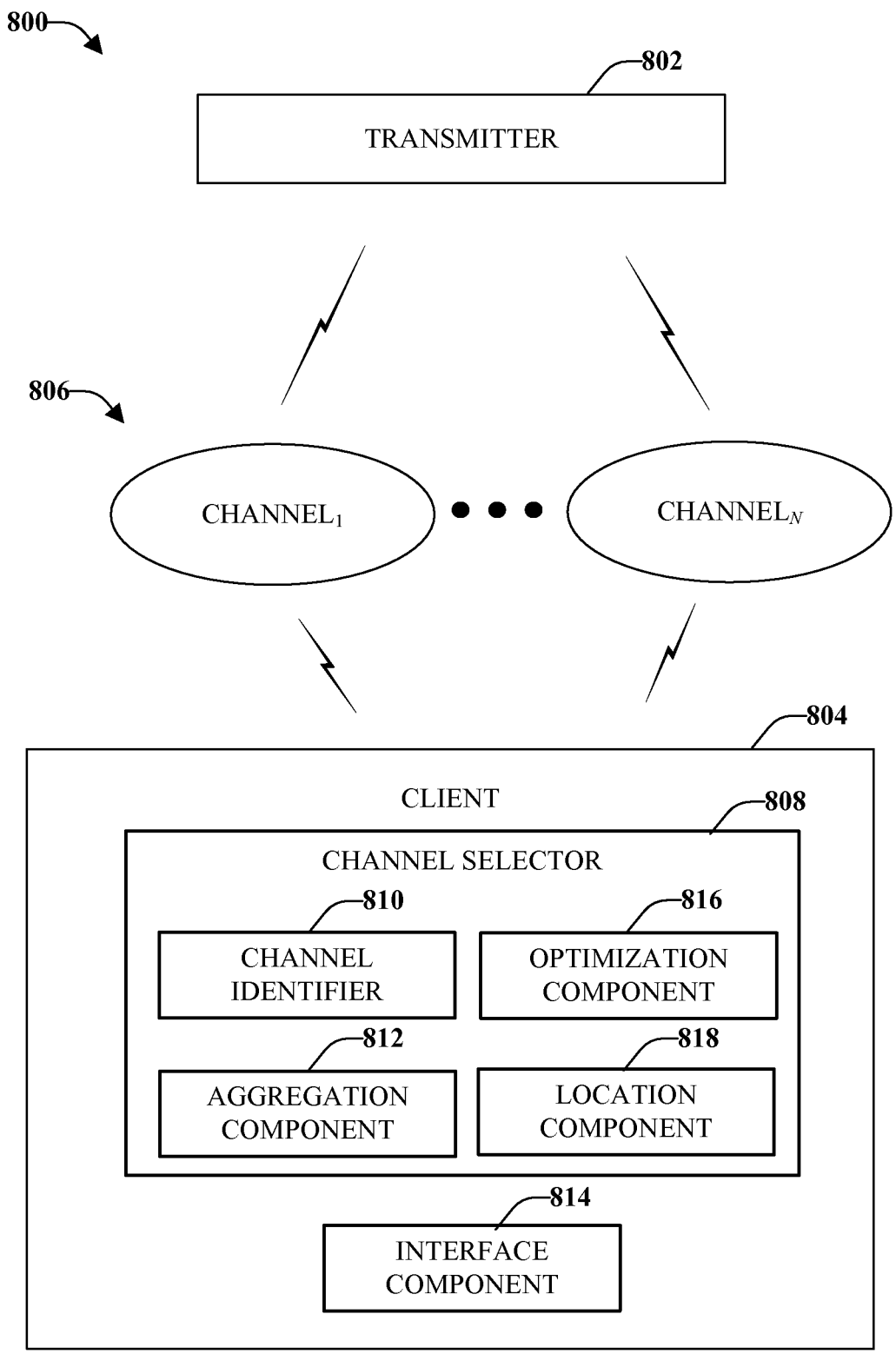
FIG. 8 illustrates another example system for facilitating multiple channel switching over a digital broadcast network.

With reference now to FIG. 8, illustrated is another example system 800 for facilitating multiple channel switching over a digital broadcast network. At times, a user might not desire to receive all information (e.g., data for all applications) broadcast by a service provider but would rather receive only a subset of the data or application. System 800 can provide the user a means, such as through an application, to dynamically accept one or more streams of transmitted data. As the one or more streams 806 are accepted by receiving device, each stream can be aggregated with additional streams of data, if any. For example, a single application data set can be partitioned into its subcomponents and each subcomponent transmitted individually. A receiving device can select which subcomponents, if any, to accept and can reconstruct portions of the application data or the entire application dataset, as desired. Thus, system 800 can optimize the amount of data delivery and the type of data that the client desires at any point in time so as to save system resources and reduce latency.

A transmitter 802 can divide a large amount of data, such as a single application, into different data streams or channels (labeled Channel$_1$ through Channel$_N$, where N is an integer) 806 based on various factors. For example, a first channel might include statistics, a second channel might include video, a third channel might include high-definition video, and so forth. A client 804 (e.g., receiver device) can aggregate one or more channels in real-time in order to create a desired user experience with minimal resource drain and enhanced quality.

Client 804 can include a channel selector 808 that can be configured to selectively accept one or more of the transmitted channels 806 based on various criteria. To facilitate selective acceptance of the channel 806, channel selector 808 can include a channel identifier 810 that can be configured to recognize features and/or data associated with each channel distributed by transmitter 802. An aggregation component 812 can be configured to select one or more channels 806 and combine, if more than one channel is selected, the channels for rendering by interface component 814 or for storage in the device memory. For example, a single channel can be selected if information in that channel is desired and information contained in the other channels is not desired. If information from more than one stream is desired, the channels can be combined to render or store (e.g., visual, audio, and/or through other perceivable means) the combination of the channels.

In accordance with some aspects, channel selector 808 can include an optimization component 816 that can be configured to facilitate selection of one or more channels 806 based on resources available at the client 804. For example, a certain channel 806 might be heavy while processing capabilities on the client 804 might be limited. For example, a desktop computer might have more processing capabilities than a cellular telephone and thus can accept a channel that utilizes a large amount of processing capabilities to render the information in an appropriate manner. To account for the resources available on the client 804, optimization component 816 can be configured to compare the capabilities or limitations of the client 804 and selectively accept or deny a channel based on information relating to the available capabilities. In one embodiment, such data is included in the information associated with each channel. Thus, if a channel is not suitable for a particular client 804, optimization component 816 can selectively ignore or deny that channel, which will not be rendered by interface component 814. In accordance with some aspects, a notification can be presented to the user, through interface component 814, which can allow the user to access a different device, with capabilities more appropriate for the channel, if the information particular to that channel is desired and cannot be processed by the current device.

Additionally or alternatively, a location component 818 can be included in channel selector 808. Location component 818 can be configured to automatically accept a channel 806 based on a client location. For example, channels could be divided by transmitter 802 based on a location (e.g., city, state, geographic area) to which the information is being sent (e.g., geographic position of the client). Thus, there can be a set of data sent to one city, a second set of data sent to a second city, and so forth. Location component 818 can automatically accept a correct set based on the determined location and can use any type of locating means (e.g., global positioning system) to facilitate locating the client. In accordance with some aspects, the information rendered on the client 804 can be based on a city or other location selected from a list (e.g., such as through interaction with interface component 814).

Figure 9:
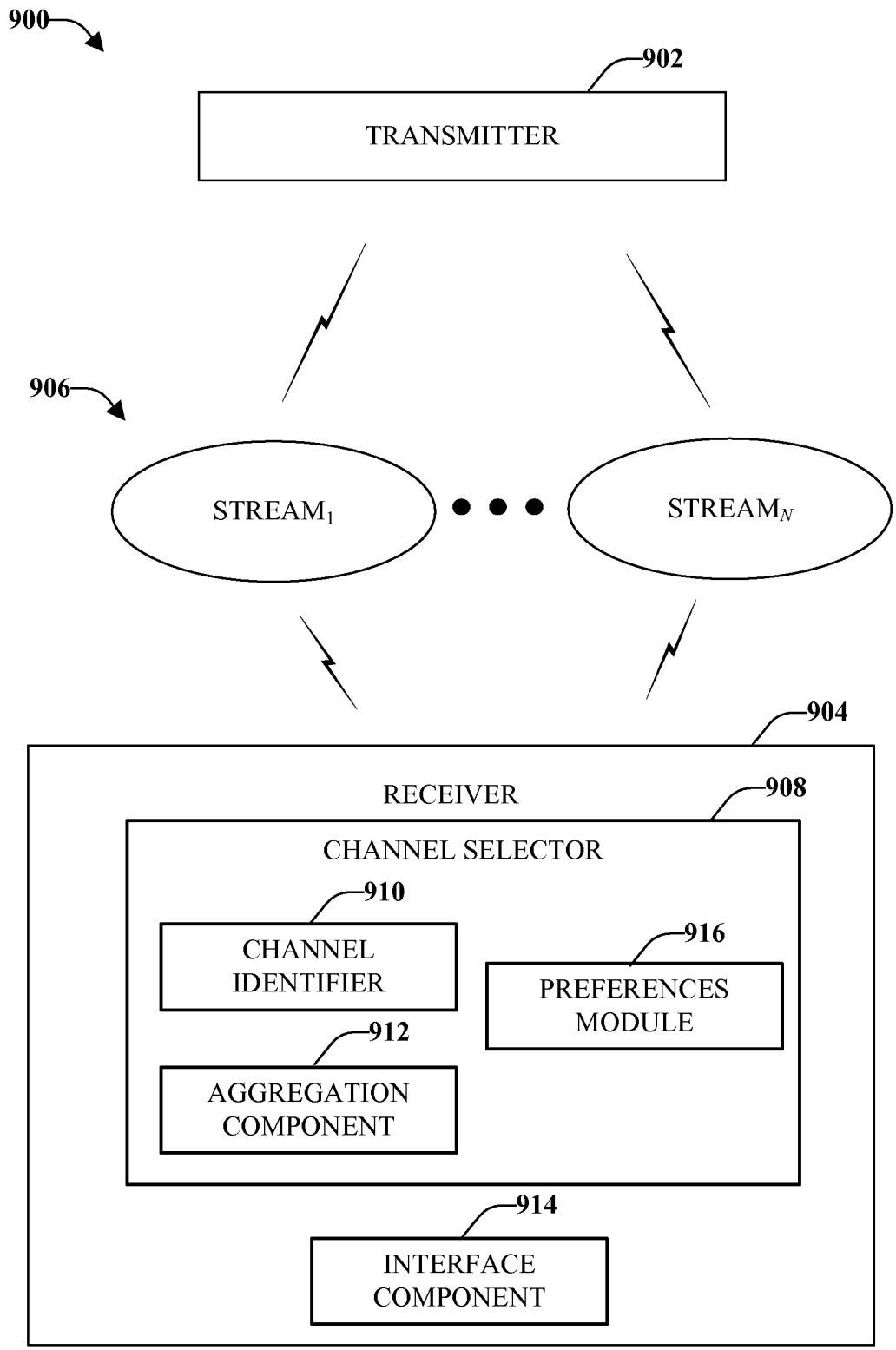
FIG. 9 illustrates an example system that selectively accepts one or more data streams based on a user preference.

FIG. 9 illustrates an example system 900 that selectively accepts one or more data streams based on a user preference. System 900 can allow personalization and concentration of the user's experience. Further, system 900 can provide an entry point for encouraging the user to feel as if the user is part of a larger community. Through usage, the user can have a "place" within the experience that the user can visit and which presents preferred information relevant to the datacast service.

In further detail, system 900 includes a transmitter 902 that can be configured to divide a datacast into different streams or channels of information that are broadcast at substantially the same time (labeled Stream$_1$ through Stream$_N$ and referred to collectively as streams 906). This broadcast information can be accepted at a receiver 904 that includes a channel selector 908 that can be configured to selectively accept one or more streams 906. Included in channel selector 908 can be a channel identifier 910 that can be configured to obtain information (e.g., metadata, tag, indicator) included in each stream that identifies the stream and the content contained therein. An aggregation component 912 can selectively accept one or more of the identified streams 906 based on various criteria (e.g., user state, user preferences, and so forth). The accepted streams can be combined (if more than one selected) and rendered (e.g., visual, audio, and so on) by interface component 914.

Also associated with receiver 902 can be a preferences module 916 that can be configured to allow customization of various preferences associated with received multicast data, which personalizes the data provided to the user through the rendering device (e.g., receiver 904). A user can selectively provide information relating to the type of data the user desires to view, such as through interaction with an interface component 914. For example, a home page can be created by leveraging the different data streams that the user selects for rendering data. Such selection can be for live game statistics, player information, team information, portfolio information, and so forth. Preferences module 916 can store user preferences or other user defined criteria (e.g., statistics, scores, stock quotes, and so forth). In accordance with some aspects, data (e.g. a particular stream) being broadcast can be accepted based in part on the stored information.

For example, in a gaming situation the data stored can be professional sporting event scores and/or user game information. In addition, for the user games, there can be a scoring system based upon points a user has "acquired" as well as other criteria. A user can store various experiences, such as "my teams", "my portfolio", "my cities", and so on, each of which can be populated by different streams (e.g. each has an associated channel).

Since some devices have limited capacity (e.g. screen size), the user can be provide with all the desired information by utilizing the stored preferences and selectively choosing different items based on that stored information. The data can be maintained in a manageable and readily retrievable format. It should be understood that presenting data based on preferences renders data that might not be a live broadcast. In accordance with some aspects, the data is being broadcast and is selectively chosen from the multiple streams 906 at substantially the same time as the streams 906 are detected by receiver 904.

Preferences module 916 can also be configured to provide a standardized selection mechanism and a standardized presentation metaphor. For example, a selection for "My Cities" can provide preferred weather forecast information (e.g., weather service). A selection for "My Portfolio" can provide preferred stock condition information (e.g., stock service). A selection for "My Teams" can provide preferred sports team tracking information (e.g., sports service). A selection for "My Players" can provide preferred athlete performance tracking information. Further, a selection for "My Statistics" can provide consumer performance in live statistics games as well as feedback (e.g., scoring for consumer performance). Other selections can also be provided based on the type of service desired.

Preferences module 916 can provide a home page that leverages the different desired data streams or channels 906. Such a home page can provide the user a "place" where they can experience a sense of interacting with the service presented.

In accordance with some aspects, a reward system for user achievement (e.g., fantasy games, live statistic games, and so forth) can be provided. Points can be used and repurposed for other features. There can be built in reward metrics and an interface can be modified to reflect consumer achievement (e.g., winning/losing fantasy game), allowing the preferences module 916 to enhance the user's service connection.

Figure 10:
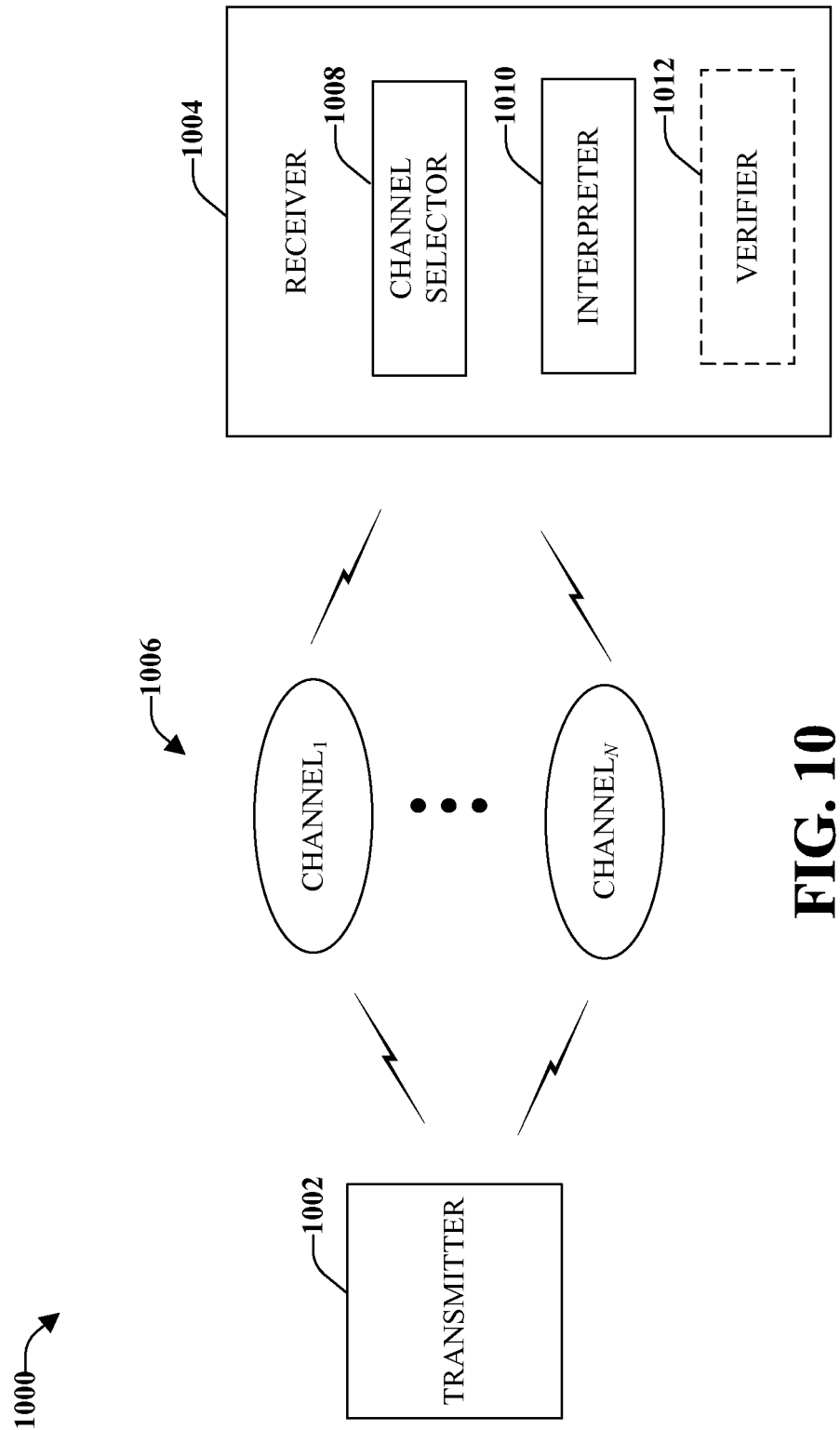
FIG. 10 illustrates an example system for providing a rich user experience by selective combining of one or more streams of data.

FIG. 10 illustrates an example system 1000 for providing a rich user experience by selective combination of one or more streams of data. System 1000 can facilitate providing custom data to devices in a one-way broadcast system. The data can be divided allowing a user device to combine selected content. System 1000 can also facilitate power savings.

System 1000 includes a transmitter 1002 that can be configured to communicate with a user device 1004 by dividing an application into multiple streams or channels 1006. Each of the multiple channels 1006 can relate to a different type of communication, such as an audio channel, a data channel, a video channel, and so forth. In accordance with some aspects, transmitter 1002 can send multiple streams 1006 that relate to different applications (e.g., a first set of streams relate to a first application, a second set of streams relate to a second application, and so forth). User device 1004 includes a channel selector 1008 that can be configured to selectively choose one or more channels 1006 that are to be presented (e.g. visual, audio, and so forth) to a user.

User device 1004 can also include an interpreter 1010 that can be configured to recognize flags or other indicators included in each of the multiple channels 1006 (e.g., a data feed). The flags allow interpreter 1010 to determine what data is part of an audio stream, for example. With this information, user device 1004 can decode the data and convert it to an audio source. Flags can further allow interpreter 1010 to distinguish which data should be rendered visually on the screen. An example of this type of service is an audio broadcast of a baseball game being broadcast to user device 1004 in conjunction with live statistics about the game. In this example, flags in the audio stream can indicate that the game statistics should be rendered visually on the screen.

In accordance with some aspects, audio data can be included in one or more channels 1006 and selectively chosen by channel selector 1008. Corresponding display data can also be selectively chosen and rendered on user device 1004 at substantially the same time as the audio is presented. For example, a user listening to a broadcast of a baseball game can further be presented with a visual interpretation (e.g., bases, where each player is located on the field, and so forth). Thus, user device 1004 can automatically synchronize the audio and the video information according to the user preferences.

In another example, for a football broadcast, a visual interpretation could be the football field, in which each team and/or player is located, tracking of the football, and so on. At substantially the same time as viewing the information, an audio feed can be broadcast. The audio data and the visual information can be provided by separate channels 1006 that are aggregated at user device 1004, such as through an aggregation component. The transmitter 1002 can include functionality to allow synchronization of the different channels 1006 by user device 1004. For example, a live broadcast can be time-shifted slightly (e.g., 30 seconds, 60 seconds) by transmitter so that the information can be perceived by the user in an understandable format. The time shifting may compensate for the audio files being received slightly faster than the data files in some configurations.

In accordance with some aspects, transmitter 1002 can provide information that can be utilized by user device 1004 to synchronize the different channels 1006 (e.g., data, video, audio, and so forth). User device 1004 can include a verifier 1012 that can be configured to analyze information contained in the selected channels 1006 to determine if the correct information has been received. Verifier 1012 can determine whether the user is listening to an audio broadcast and should be presented with a data representation of the play-by-play information. The information needed for synchronization can be encapsulated within the audio stream, for example. Thus, system 1000 can provide a synchronization service so that the visually rendered data matches the audio stream information.

In accordance with some aspects, verifier 1012 can be configured to obtain information from at least one selected channel 1006 that is not currently being presented to the user. For example, the newly selected channel might conflict with another selected channel because both channels need to utilize the same resources (e.g. display screen, speakers, and so on). Information relating to the non-presented channel can be provided to the user, such as through an interface component, with indications of how the user can be presented with the new channel.

For example, a first hockey game is being watched on a display screen and a second hockey game is selected by channel selector 1008 (e.g., a subsequent channel is received that conforms to various selection parameters). Information included in the second selected channel can indicate that it should be presented to the user on a display screen. A notification can be presented to the user to determine whether the user would like to be presented with the second hockey game at substantially the same time as the user is presented with the first hockey game or if it should be presented in place of the first hockey game. Depending on the user's response, a second display area could be provided on the display screen (e.g., picture within a picture). This double presentation of visual information can be presented at substantially the same time as audio information is presented that relates to the first or second hockey game, or to a different game, program or application (e.g., viewing games while listening to a disclosure interview). In such a manner, system 1000 can enrich the user experience by allowing the user to perceive multiple channels that can relate to one application (e.g., a single ball game) or to multiple applications (e.g., more than one ball game).

Figure 11:
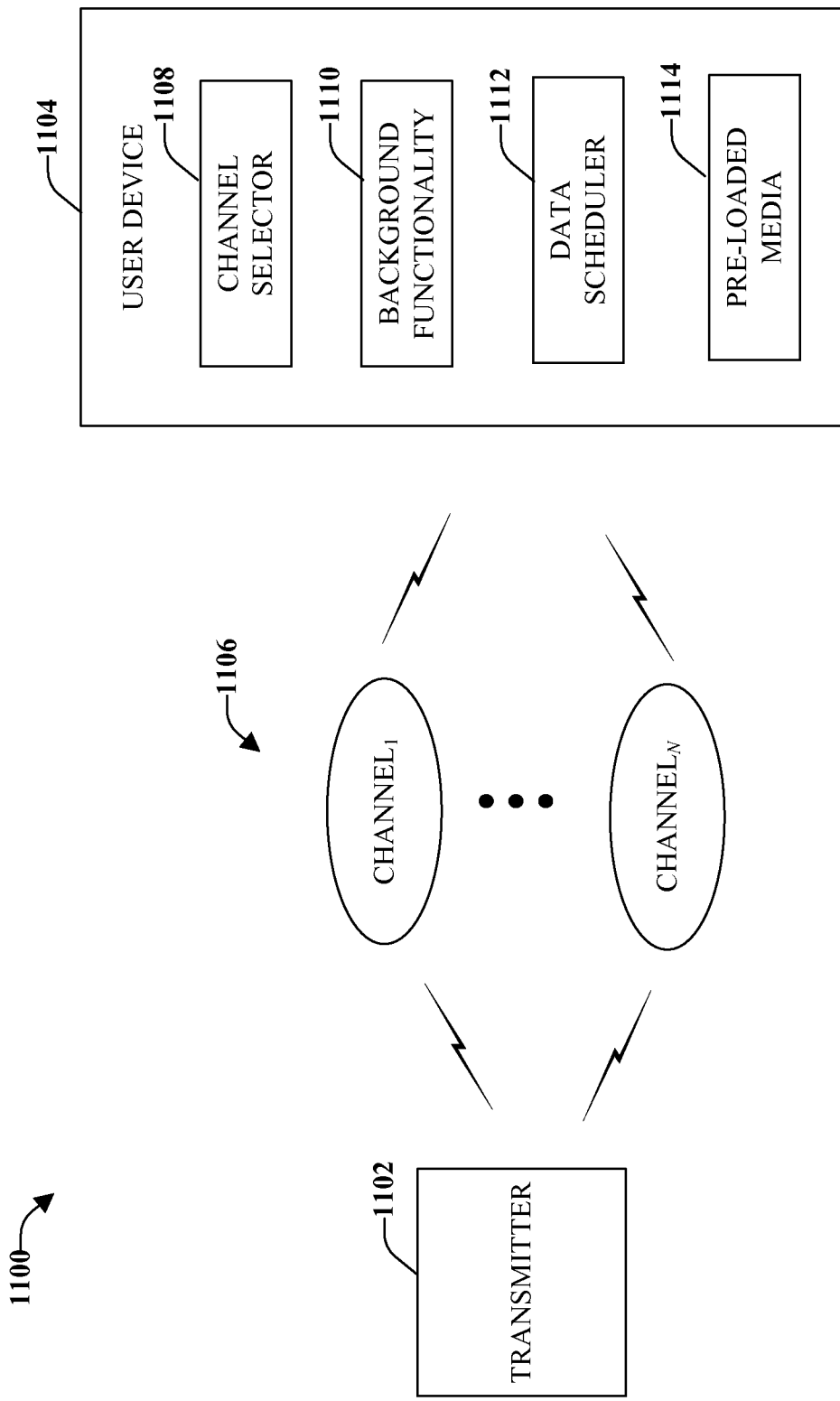
FIG. 11 illustrates another example system for providing a rich user experience by selective combining of one or more streams of data.

FIG. 11 illustrates another example system 1100 for providing a rich user experience by selective capture of one or more data streams. System 1100 is similar to the system of FIG. 10 and can provide a hybrid service that allows audio streams, video streams and/or pre-loaded media files to be rendered on a device at substantially the same time as a data experience and/or a live audio stream. System 1100 can provide greater functionality and flexibility over a "data-only" experience by combining text, audio streams, video streams and/or pre-loaded media files. Thus, a greater number of experiences can be provided over a digital broadcast network.

In this system 1100, user device 1104 includes background functionality 1110 that can be configured to tune into a broadcast stream to "download" media files when the user device 1104 is not in use (e.g., is in idle or standby mode). A data scheduler 1112 can be configured to provide a schedule for the download connections. The connection times can be based on the schedule provided by data scheduler 1112, which can have multiple "contact windows," in case repeated attempts to access data are needed.

For example, a schedule can provide that a particular channel 1106 or broadcast is to be downloaded at 11:00 a.m., 12:30 p.m. and 3:00 p.m. If the download is completed at 11:00 a.m., the remaining scheduled download times are ignored or the download can be initiated and terminated when it is determined that the download is completed (data is, already loaded in device 1104). If the download at 11:00 a.m. was not completed (e.g., was interrupted, encountered errors, and so forth), the download can repeat at the next scheduled time (e.g., 12:30 p.m.). Any number of download times (windows) can be provided depending on various criteria (e.g., predefined number of attempts, speed of data connection, strength of data connection, importance of the information, user selection, as well as other factors).

The broadcast stream can be downloaded and stored as pre-loaded media 1114. The pre-loaded media can include an entire application (e.g., program, sporting event, and so on) or it can be an audio or video clip or small segment. For example, rather than obtaining a live broadcast of an audio or video, system 1100 can store clips or segments locally on the device 1104 or in a remote device. Received broadcast data can be synchronized with the stored clips, mitigating the need to synchronize broadcast streams.

In accordance with some aspects, data in the broadcast stream could trigger the client-side media files (e.g., pre-loaded media 1114). The data stream can provide file information as well as source data indicating what to do if the file does not exist (e.g., how to access the file remotely, a different file that can be utilized, whether or not to ignore the request for the file, and so forth). Transmitter 1102 can send triggers along with the data streams 1107, which the device 1104 interprets to determine when to render a stored data file (e.g., clips). Thus, device 1104 can receive live data streams that allow the user to view live data as well as view the pre-loaded media files at substantially the same time.

For example, a video clip can be a three-second view clip that is rendered based on a trigger indication received in at least one broadcast stream 1106. The video clip can be a generic clip that is shown with live audio (new streams 1106). In accordance with some aspects, downloads are scheduled such that the device 1104 stores clips for a predetermined time. After expiration of the time, the data broadcast can implement a fist clip, and the user can perceive (e.g., visual, audio, and so forth) some data. A second clip can then be implemented, allowing the user to perceive different data, which might be in the same or a different format. At another time (e.g., next day, next week), one or more new clips can be downloaded and stored by device 1104.

In accordance with another aspect, for the pre-loaded media files 1114, receiver 1104 can initiate a background process 1110 when the receiver 1104 is not in use and tunes into a broadcast stream to "download" media files. These connections can be based on a schedule provided by scheduler 1112 with multiple "contact windows" in case previous attempts to access the data fail. An example of this type of service would be an application that receives live data streams that allow the user to view live data and then view the pre-loaded media files. In addition to the pre-loaded media files and live data experience, the device could produce a live audio component at substantially the same time as the visually rendered data. Data in the broadcast stream could trigger the client side media files 1114. The data stream provides information to the client, which includes the available files as well as alternate retrieval information. The server can provide a matching service so that the visually rendered data corresponds to the audio stream information.

In accordance with some aspects, system 1100 can facilitate client side cache advertising. For example, if an advertiser desires to promote a ring, a short visual clip of the ring can be sent to the device 1104 to be included as pre-loaded media. A trigger can be provided that at a certain time or based on a certain event (e.g., activation of device 1104, a particular user interaction with device, such as pressing a certain key or opening/closing the application, and so forth) the ring clip can be presented to the user. Additionally, the clip can include data relating to contact information to purchase the ring and/or a special promotional code. In accordance with some aspects, data sent to receiver 1104 is a trigger to invoke the cached media file 1112 and does not include any other data.

Additionally or alternatively, a content provider or advertiser might load various media files on a device 1104 during an initial initialization process. Thus, as a user receives and begins using the device 1104 one or more streams can be broadcast that provide a key that selectively releases a media file at a certain point (e.g., release on Friday at 8:00 p.m. if the user is actively using the device). Another example of pre-loaded media content can be a video clip that is stored on a device and when there is a radio broadcast of the song associated with the video clip, the video clip is automatically displayed.

In accordance with another aspect, a content provider might allow a pre-loading or downloading of a programming content and only allow that content to be unlocked at a certain, predetermined time. For example, a user might be going on vacation and will be on a plane and out of range for a premiere of a movie. The user can be provided the ability to download the movie prior to departure and, even though while on the plane the user does not have reception, the user can view the movie at substantially the same time as it is premiered. The data (movie in this example) can automatically erase after it is viewed.

Figure 12:
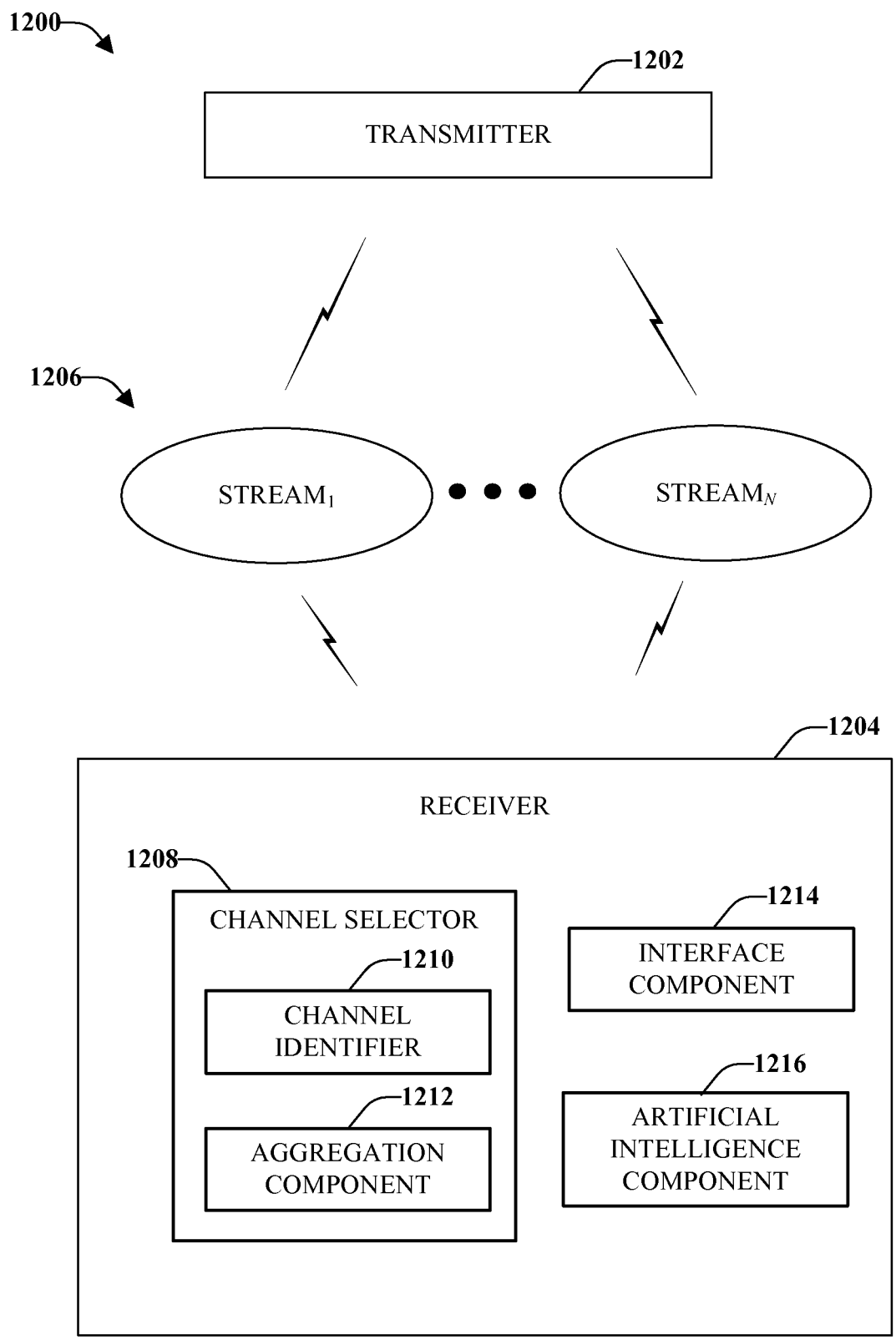
FIG. 12 illustrates an example system that utilizes artificial intelligence to automate one or more aspects.

FIG. 12 illustrates an example system 1200 that utilizes artificial intelligence to automate one or more aspects. Intelligent management of broadcast data enables deep, sophisticated and intuitive user experiences. The creation of client functionality and server support for tuning into multiple broadcast channels can provide client software that offers rich and entertaining user experiences within the operational limitations of the broadcast platform.

Intelligent client software can include functionality that tunes into separate broadcast channels in a specific manner. The functionality is responsive to user interaction with the client software. The software can facilitate acquiring and filling data necessary for the user experience in a manner that is transparent to the user. Rather than listening to a single broadcast channel for data, multiple broadcast connections are regularly opened and closed based on the application needs. Client functionality for tuning into separate broadcast channels can also be provided. Additional features include client functionality for managing the data received on multiple broadcast channels. Additional features include server functionality to facilitate the same.

In further detail, system 1200 employs artificial intelligence (AI) methods, which can be facilitated by AI component 1216, as illustrated. The various embodiments (in connection with selectively accepting one or more streams of data) can employ various AI-based schemes (e.g., machine learning, rules-based techniques) for carrying out various aspects thereof. For example, a process for determining whether a particular stream should be rendered on a user device, or might be of interest to the user can be facilitated through an automatic classifier system and process. For example, based on a user state AI component 1216 can identify the data that should be selected based on an inference of what a user in that state would desire.

A classifier is a function that maps an input attribute vector, $x=(x1, x2, x3, x4, xn)$, to a confidence that the input belongs to a class, that is, $f(x)=\text{confidence}(\text{class})$. Such classification can employ a probabilistic and/or statistical-based analysis (factoring into the analysis utilities and costs) to prognose or infer an action that a user desires. In the case of data streams, for example, attributes can be included within a particular stream (e.g., indicator, metadata), and the classes are categories or areas of interest (e.g., user preferences, device information, and so forth).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence. Classification as used herein also is inclusive of statistical regression that is utilized to develop models of priority.

As will be readily appreciated from the subject specification, the one or more embodiments can employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining, according to a predetermined criteria, which streams to render on a device and which streams would be of interest to a user of the device. The criteria can include, but is not limited to, the type of data included in each stream, the content included in each stream, device information, user preferences, and user state.

Figure 13:
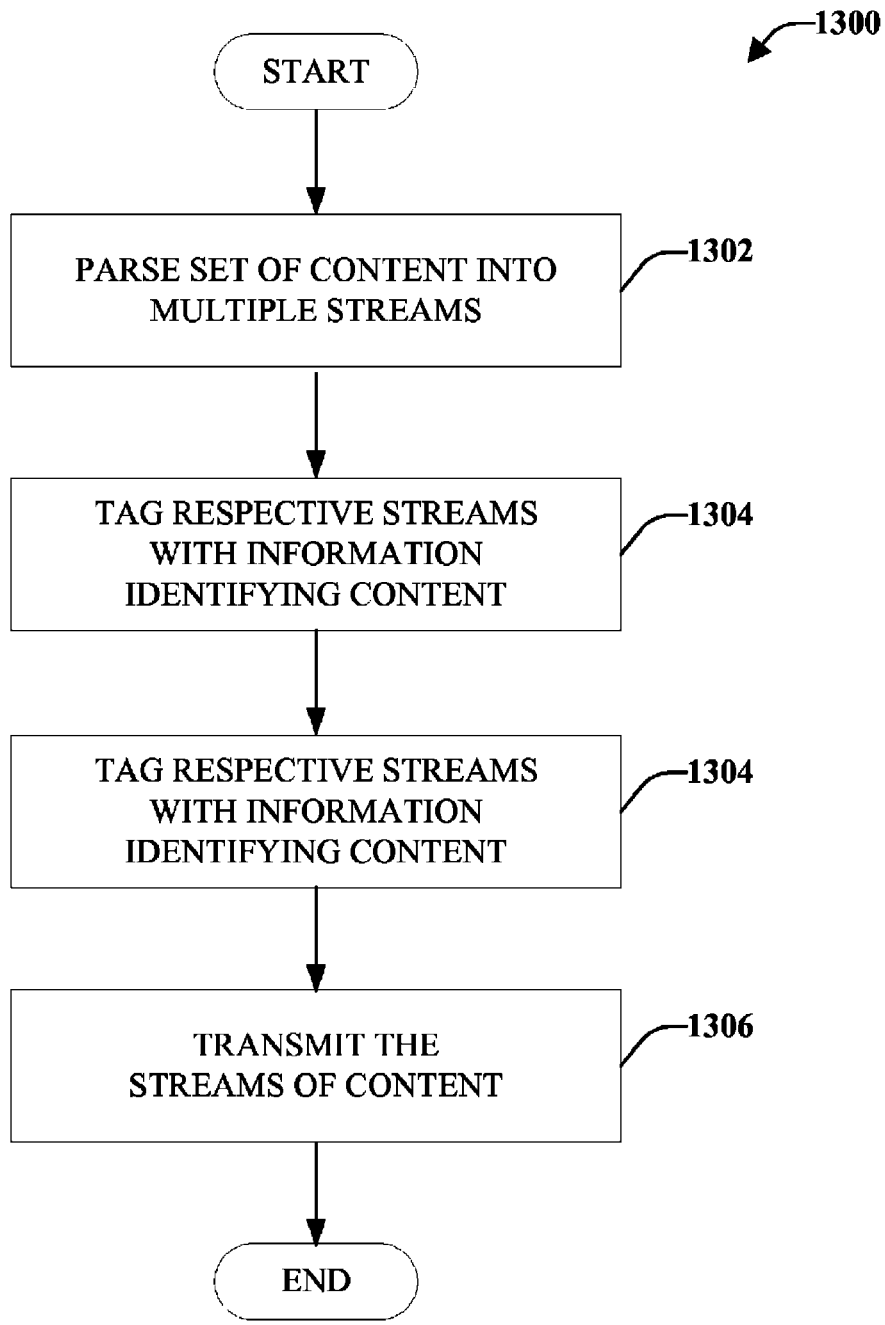
FIG. 13 illustrates a method for providing content.
Figure 14:
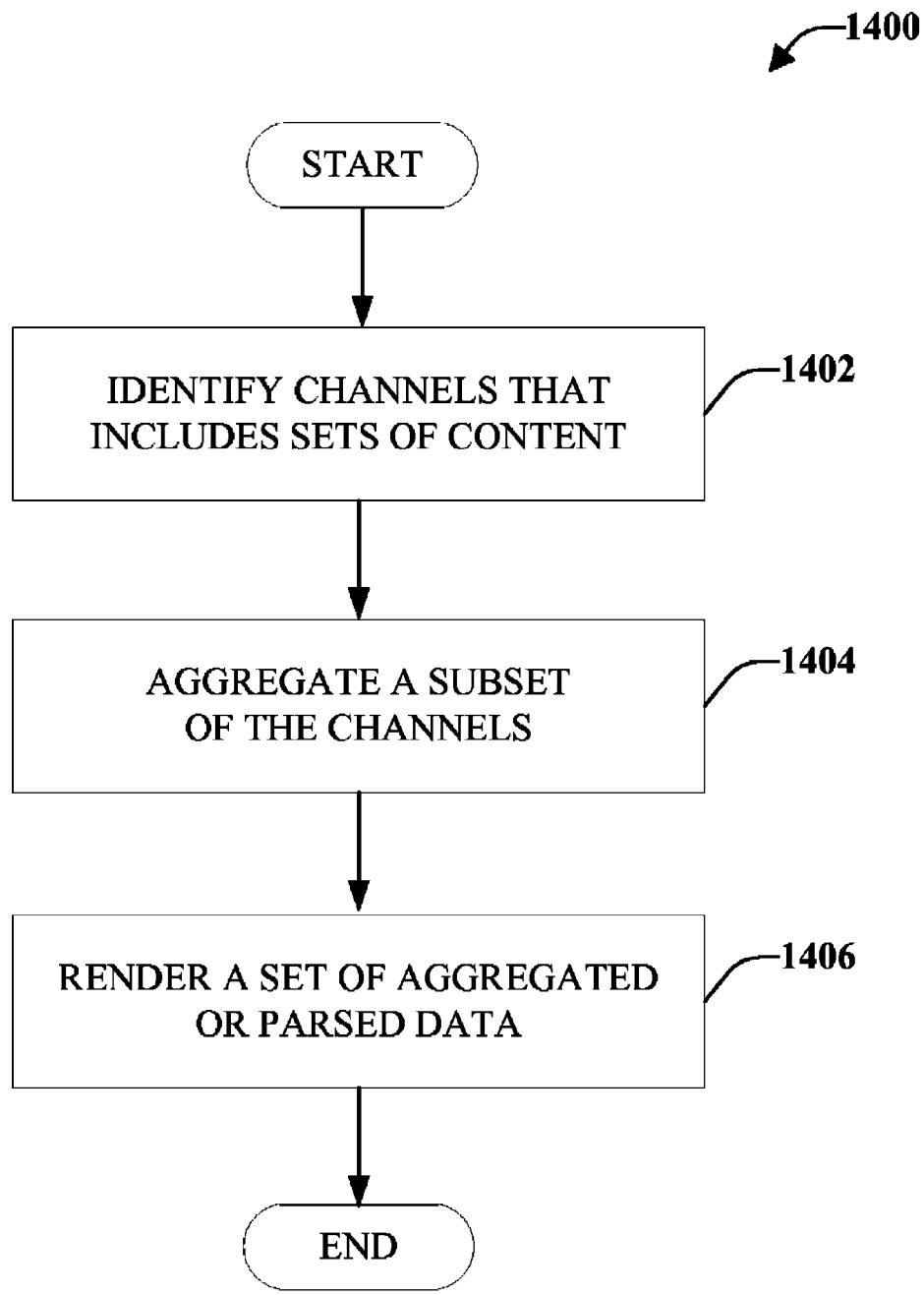
FIG. 14 illustrates a method for selectively rendering content.
Figure 15:
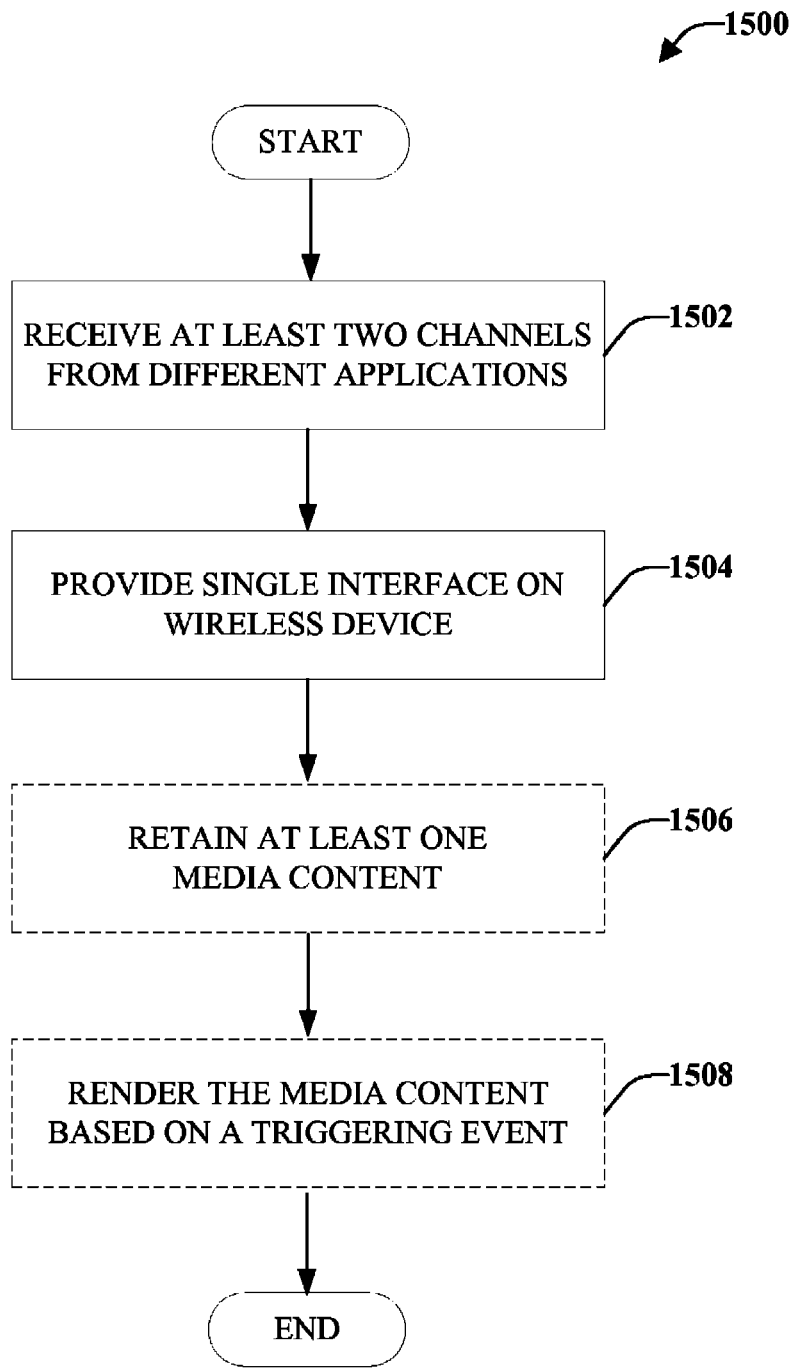
FIG. 15 illustrates a method for rendering content.

In view of the exemplary systems shown and described above, methodologies that may be implemented in accordance with the disclosed subject matter, will be better appreciated with reference to the flow charts of FIGS. 13-15. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 13 illustrates a method 1300 for providing content. Method 1300 can facilitate dividing application data into two or more streams based on predefined criteria. The divided application data can be broadcast to one or more receiving devices that can selective determine whether to receive one or more of the streams for rendering to a user through interaction with the receiving device.

At 1302, a data set is parsed into multiple streams. The parsing can be based on the content type (e.g. video, audio, high definition video, and so forth) or other criteria. In accordance with some aspects, the parsing is based on the specific content information. For example, content can include a first set of information, a second set of information, and a third set of information. The content can be parsed into three or more streams, each stream dedicated to one of the sets of information.

At 1304, each respective stream is tagged with information that identifies the content included in each stream. The tag can be an indicator or flag that a receiving device can interpret to make a determination whether to accept the stream. In accordance with some aspects, the tag includes information identifying associated streams. For example, an audio stream can include a tag or other indicator that allows a receiving device to identify an associated video stream, if any. In such a manner, the receiving device can selectively determine whether to accept and present to a user one or both streams.

The streams of content can be selectively transmitted, at 1306. The streams can be transmitted at substantially the same time or at different times, which might be slightly offset to take into account the presentation of each stream by a receiving device. For example, a data file might be transmitted slightly before a corresponding audio file is transmitted. In such a manner, both files might arrive at a receiving device at about the same time.

FIG. 14 illustrates a method 1400 for selectively rendering content. Substantially simultaneous with the arrival of the content, a determination is made as to whether to accept each individual channel. Some channels might be accepted and presented to a user while an associated channel is not accepted (e.g., an audio channel is accepted but the corresponding video channel is not accepted). An associated channel can be initiated (and selectively accepted or ignored) based on information included in at least one of the accepted channels (e.g. included with the tag or indicator).

Method 1400 starts, at 1402, when one or more channels are received and content contained therein is identified. The content included in each channel can be identified based on tags or other data included in each channel. The tags can identify the type of content, the information included in the channel, associated channels, etc. Based on the tag, each channel can be selectively accepted or denied. The acceptance or denial determination can also be made in conjunction with selection parameters, such as policies, rules, user preferences, user state, time of day, current activity, or combinations thereof. If a channel does not conform to at least one selection parameter, it can be ignored (e.g. not accepted).

In accordance with some aspects, the selection can be made based in part on device capabilities or available resources. If the available resources are not adequate to support at least one of the channels that should be selected according to the selection algorithm, a notification can be presented to a user. In another aspect, the selection can be made based in part on a location, which can be established through any type of locating means (e.g. GPS) or through a manual entry (e.g., user enters a location).

If more than one channel is accepted, the channels are aggregated, at 1404. The aggregation can be performed in real-time and can take into account different delivery times of each stream. Additionally, the streams can be stitched together in order to provide a rich user experience. For example, a first channel can be a data channel and a second channel can be an audio channel. If the first channel arrived later than the second channel, the aggregation can selectively shift or offset the start of the second channel. At 1406, the subset of content (e.g., accepted channels) are rendered on receiving device in any perceivable manner. A customized home page can be created based on the aggregated subset of channels and selectively presented to the user as a home page.

FIG. 15 illustrates a method 1500 for rendering content. Method 1500 facilitates rendering audio streams, video streams and/or pre-loaded media files on a wireless device at substantially the same time as a data experience and/or a live audio stream. Method 1500 can provide greater functionality and flexibility over a "data-only" experience by combining text, audio streams, video streams and/or pre-loaded media files.

Method 1500 starts, at 1502, when at least two channels that represent different applications are received at a wireless device. The different applications can be similar activities, such as different sporting events (e.g., football, baseball, golf, and so on) or the different applications can be different activities (e.g., sporting event, stock information, business data, and so forth). The different applications might be related although it is contemplated that the applications are not related.

At 1504, a single interface on the wireless device is provided. The interface can render data in a number of perceivable formats (e.g. visual, audio, and so on). The single interface can render at least a first audio content and a video content at substantially the same time. The first audio content and the video content are from different applications, as discussed above. In accordance with some aspects, at least a second video content associated with another application can be displayed on the single interface at substantially the same time as the first video content is displayed.

A data stream that corresponds to the audio content can be decoded and data that should be rendered visually on the single interface can be distinguished from other data. A request can be presented to a user to verify whether the video content should be replaced by the data or whether the video content and the data should be presented at substantially the same time. Depending on the response to the verification request, the data can be replaced or rendered at substantially the same time as the other data.

Additionally or alternatively, at 1506, at least one media content is retained in a retrievable format, such as a storage media. The media content can be a client side cache advertising or other information that should be presented to the user in place of live-broadcast content. The media content can be preloaded during manufacture or other times prior to distribution of the wireless device (e.g., before a user has possession of the device). In accordance with some aspects, the media content can be downloaded based on a downloading schedule, during an idle state and/or by utilizing background functionality associated with the wireless device.

At 1508, the at least one media content can be selectively rendered in a perceivable format based on a triggering event. The triggering event can be one or more of a time (e.g., a predetermined day and minute of the day), a received broadcast (e.g., broadcast that initiates the rendering of the media content), or an action (e.g., a manual function performed by a user such as powering up a device).

Figure 16:
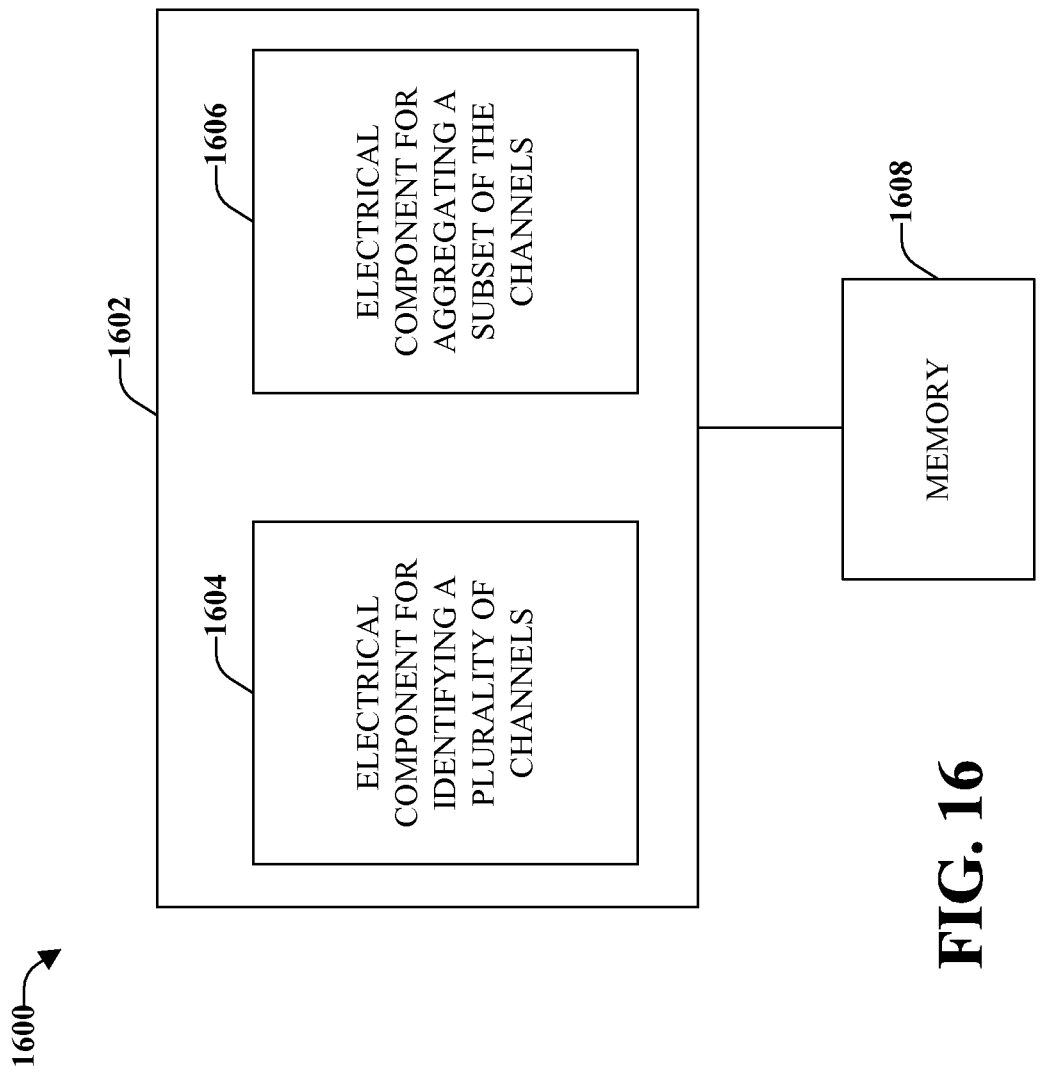
FIG. 16 illustrates a system that selectively renders at least a subset of content.

With reference to FIG. 16, illustrated is an example system 1600 that selectively renders at least a subset of content. For example, system 1600 may reside at least partially within a mobile device. It is to be appreciated that system 1600 is represented as including functional blocks, which may be functional blocks that represent functions implemented by a processor, software, or combinations thereof (e.g., firmware).

System 1600 includes a logical grouping 1602 of electrical components that can act separately or in conjunction. For instance, logical grouping 1602 may include an electrical component for identifying a plurality of channels 1604. The channels can include respective sets of content. Also included can be an electrical component for aggregating a subset of the channels to render a set of aggregated or parsed content 1606. Aggregating the subset of content can be performed in real-time.

Alternatively or additionally, the electrical component for identifying a plurality of channels 1604 can further detect a tag associated with each of the plurality of channels. The tag can include information relating to a content of each of the plurality of channels.

In accordance with some aspects, logical grouping 1602 can include an electrical component for selectively accepting at least the subset of channels based on the detected tag information and at least one selection parameter. The selection parameter can include at least one of a rule, a policy, a user preference, a user state, a time of day, a current activity, or combinations thereof. Further, logical grouping 1602 can include an electrical component for selecting the subset of channels based in part on a location.

Logical grouping 1602 might include an electrical component for determining an associated channel based on information included in at least one of the plurality of channels. Logical grouping 1602 might also include an electrical component for ignoring at least one channel of the plurality of channels associated with an application on a user device if the at least one channel does not conform to at lest one selection parameter.

Logical grouping 1602 might also include an electrical component for selecting the subset of channels with reference to data corresponding to available resources and an electrical component for notifying a user if available resources are not adequate to support at least one of the plurality of channels. Further, logical grouping 1602 might include an electrical component for creating a customized home page based on the aggregated subset of channels.

Additionally, system 1600 can include a memory 1608 that retains instructions for executing functions associated with electrical components 1604 and 1606 or other components. While shown as being external to memory 1610, it is to be understood that one or more of electrical components 1604 and 1606 may exist within memory 1610.

Figure 17:
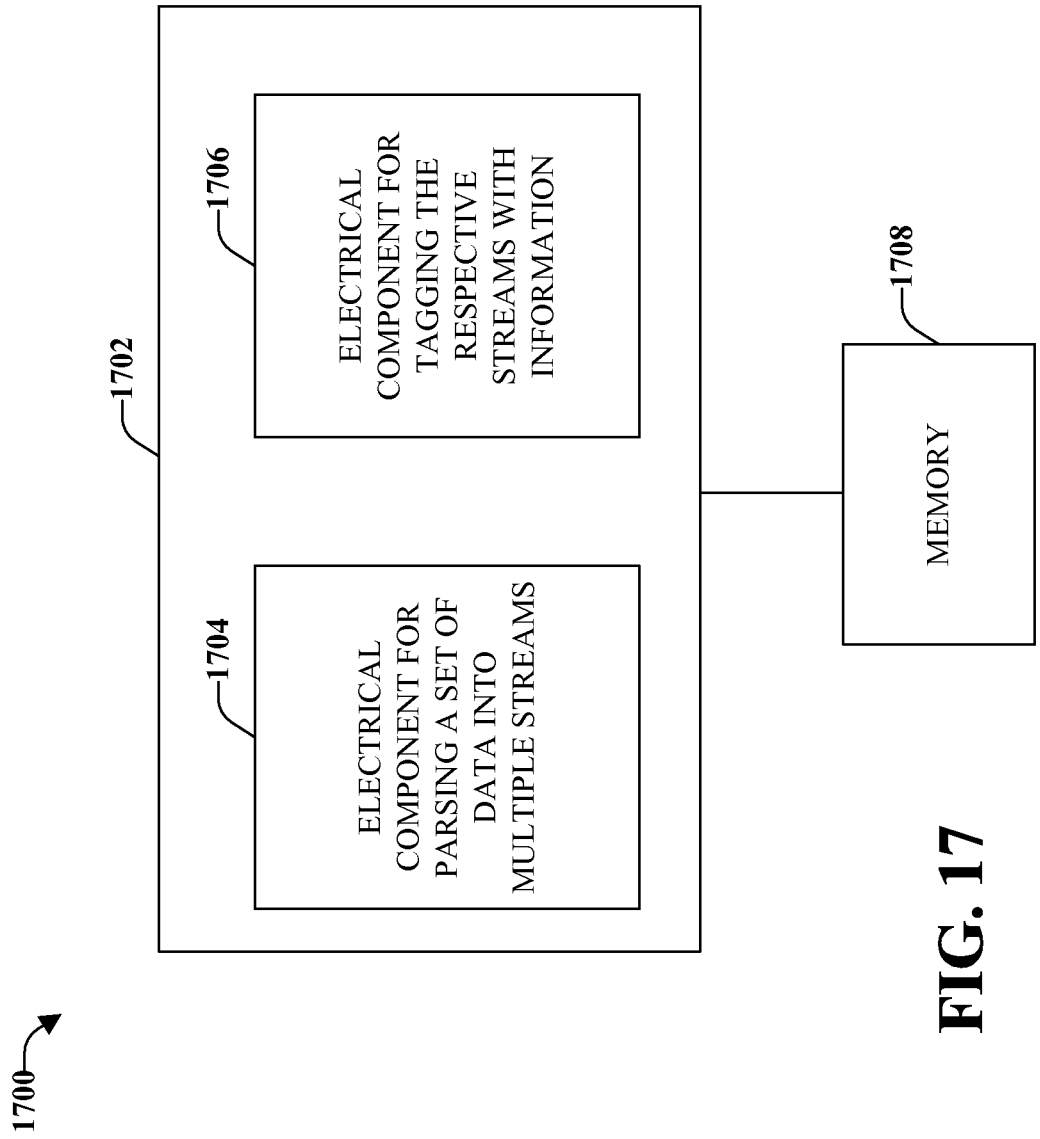
FIG. 17 illustrates a system that selectively provides multiple streams of content.

FIG. 17 illustrates an example system 1700 that selectively provides multiple streams of content. System 1700 may reside at least partially within a base station. It is to be appreciated that system 1700 is represented as including functional blocks, which may be functional blocks that represent functions implemented by a processor, software, or combination thereof (e.g. firmware).

System 1700 includes a logical grouping 1702 of electrical components that can act separately or in conjunction. For instance, logical grouping 1702 may include an electrical component for parsing a set of data into multiple streams 1704. Also included can be an electrical component for tagging the respective streams with information to identify content within each stream 1704. In accordance with some aspects, logical grouping 1702 can include an electrical component for transmitting each of the multiple streams at substantially the same time or shifting the transmission timing of at least one stream based on a transmission speed.

Additionally, system 1700 can include a memory 1708 that retains instructions for executing functions associated with electrical components 1704 and 1706 or other components. While shown as being external to memory 1708, it is to be understood that one or more of electrical components 1704 and 1706 may exist within memory 1708.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for displaying content on a display of a user terminal equipment, comprising:
   identifying a plurality of channels that include respective sets of content associated with a user application, two or more of the plurality of channels received via a one-to-many transmission over a communications network;
   selectively disregarding at least one channel of the plurality of channels associated with an application on a user terminal equipment if the at least one channel does not conform to at least one selection parameter relating to adequacy of available resources to support the selectively disregarded at least one channel, including comparing capabilities of the user terminal equipment for displaying the selectively disregarded at least one channel on a display of the user terminal equipment and selectively accepting or denying a channel based on information relating to the capabilities of the user terminal equipment for displaying the channel on the display of the user terminal equipment;
   presenting a notification of the selectively disregarded at least one channel of the plurality of channels, wherein the notification allows a user to access a different user terminal equipment having different capabilities more appropriate for displaying the selectively disregarded at least one channel on another display of the different user terminal equipment; and
   aggregating a subset of the two or more of the plurality of channels and displaying a set of aggregated or parsed content, wherein aggregating the subset of the two or more of the plurality of channels is performed in real-time.

2. The method of claim 1, wherein identifying the plurality of channels comprises detecting a tag associated with each of the plurality of channels, wherein the tag includes information relating to a content of each of the plurality of channels.

3. The method of claim 2, further comprising selectively accepting at least the subset of the two or more of the plurality of channels based on the information of the detected tag.

4. The method of claim 1, further comprising selecting the subset of the two or more of the plurality of channels based in part on a location.

5. The method of claim 1, further comprising determining an associated channel based on information included in at least one of the plurality of channels.

6. The method of claim 1, further comprising selecting the subset of the two or more of the plurality of channels by reference to data corresponding to available resources and notifying a user if available resources are not adequate to support at least one of the plurality of channels.

7. The method of claim 1, further comprising creating a customized home page based on the aggregated subset of the two or more of the plurality of channels.

8. A user terminal equipment for displaying content on a display thereof, comprising:
   a computer platform having a memory and a processor, wherein the memory comprises a selection parameter;
   a user interface in communication with the computer platform;
   a channel identifier that identifies a plurality of channels that include respective sets of content associated with a user application, two or more of the plurality of channels received via a one-to-many transmission over a communications network;
   a channel selector that selectively disregards at least one channel of the plurality of channels associated with a single application of the user terminal equipment if the at least one channel does not conform to at least one selection parameter relating to adequacy of available resources to support the selectively disregarded at least one channel, including comparing capabilities of the user terminal equipment for displaying the selectively disregarded at least one channel on a display of the user terminal equipment and selectively accepting or denying a channel based on information relating to the capabilities of the user terminal equipment for displaying the channel on the display of the user terminal equipment;
   an interface component for presenting a notification of the selectively disregarded at least one channel of the plurality of channels, wherein the notification allows a user to access a different user terminal equipment having different capabilities more appropriate for displaying the selectively disregarded at least one channel on another display of the different user terminal equipment; and
   an aggregation component that aggregates a subset of two or more of the plurality of channels and displays a set of aggregated or parsed content, wherein the aggregation component aggregates the subset of the two or more of the plurality of channels in real-time.

9. The user terminal equipment of claim 8, wherein the channel identifier detects an indicator included in each of the plurality of channels, wherein the indicator provides information associated with each of the plurality of channels, the user terminal equipment further comprises a channel selector that accepts at least the subset of the two or more of the plurality of channels based on the information of the detected indicator and at least one selection parameter that includes at least one of a rule, a policy, a user state, a time of day, and a current activity, or combinations thereof.

10. The user terminal equipment of claim 9, further comprises a location component that determines a location, wherein a channel selector uses the location to select the subset of the two or more of the plurality of channels.

11. The user terminal equipment of claim 9, wherein the channel identifier further determines an associated channel based on the information of the detected indicator of at least one channel of the plurality of channels.

12. The user terminal equipment of claim 9, further comprises an optimization component that determines available resources, wherein each selected channel of the plurality of channels is selected based in part on the determined available resources, the interface component presents a notification if the available resources are not adequate to support at least one of the plurality of channels.

13. The user terminal equipment of claim 9, further comprises a preferences module that creates a customized home page based in part on the aggregated subset of the two or more of the plurality of channels.

14. An apparatus for selectively displaying at least a subset of content on a display of a user terminal equipment, comprising:
    means for identifying a plurality of channels that include respective sets of content associated with a user application, two or more of the plurality of channels received via a one-to-many transmission over a communications network;
    means for selectively disregarding at least one channel of the plurality of channels associated with an application on a user terminal equipment if the at least one channel does not conform to at least one selection parameter relating to adequacy of available resources to support the selectively disregarded at least one channel, including means for comparing capabilities of the user terminal equipment for displaying the selectively disregarded at least one channel on a display of the user terminal equipment and selectively accepting or denying a channel based on information relating to the capabilities of the user terminal equipment for displaying the channel on the display of the user terminal equipment;
    means for presenting a notification of the selectively disregarded at least one channel of the plurality of channels, wherein the notification allows a user to access a different user terminal equipment having different capabilities more appropriate for displaying the selectively disregarded at least one channel on another display of the different user terminal equipment; and
    means for aggregating a subset of the two or more of the plurality of channels and displaying a set of aggregated or parsed content, wherein the means for aggregating the subset of the two or more of the plurality of channels is performed in real-time.

15. The apparatus of claim 14, wherein the means for identifying a plurality of channels further detects a tag associated with each of the plurality of channels, the tag includes information relating to a content of each of the plurality of channels.

16. The apparatus of claim 15, further comprising a means for selectively accepting at least the subset of the two or more of the plurality of channels based on the information of the detected tag and at least one selection parameter.

17. The apparatus of claim 16, wherein the selection parameter includes at least one of a rule, a policy, a user state, a time of day, a current activity, or combinations thereof.

18. The apparatus of claim 16, further comprises means for selecting the subset of the two or more of the plurality of channels based in part on a location.

19. The apparatus of claim 14, further comprising means for determining an associated channel based on information included in at least one of the plurality of channels.

20. The apparatus of claim 14, further comprising means for selecting the subset of the two or more of the plurality of channels with reference to data corresponding to available resources and means for notifying a user if available resources are not adequate to support at least one of the plurality of channels.

21. The apparatus of claim 14, further comprising means for creating a customized home page based on the aggregated subset of the two or more of the plurality of channels.

22. A non-transitory machine-readable medium having stored thereon machine-executable instructions for:
    identifying a plurality of channels that include respective sets of content, wherein each of the plurality of channels is associated with an identifier associated with a user application, two or more of the plurality of channels received in a user terminal equipment via a one-to-many transmission over a communications network;
    selectively disregarding at least one channel of the plurality of channels associated with an application on the user terminal equipment if the at least one channel does not conform to at least one selection parameter relating to adequacy of available resources to support the selectively disregarded at least one channel, including comparing capabilities of the user terminal equipment for displaying the selectively disregarded at least one channel on a display of the user terminal equipment and selectively accepting or denying a channel based on information relating to the capabilities of the user terminal equipment for displaying the channel on the display of the user terminal equipment;
    presenting a notification of the selectively disregarded at least one channel of the plurality of channels, wherein the notification allows a user to access a different user terminal equipment having different capabilities more appropriate for displaying the selectively disregarded at least one channel on another display of the different user terminal equipment; and
    aggregating a subset of the two or more of the plurality of channels and displaying a set of aggregated or parsed content, wherein the instructions for aggregating the subset of the two or more of the plurality of channels is performed in real-time.

23. The non-transitory machine-readable medium of claim 22, the instructions further comprising:
    selectively accepting at least the subset of the two or more of the plurality of channels based on the identifier and at least one of a selection parameter, a location, available resources, or combinations thereof.

24. In a wireless communication system, an apparatus comprising:
    a processor configured to:
    identify a plurality of channels that include respective sets of content associated with a user application, wherein each of the plurality of channels is associated with an identifier associated with a user application, two or more of the plurality of channels received via a one-to-many transmission over a wireless communications network;
    accept at least a subset of the plurality of channels based on the identifier and at least one of a selection parameter, a location, available resources, or combinations thereof;
    selectively disregard at least one channel of the plurality of channels associated with the user application on a user terminal equipment if the at least one channel does not conform to at least one selection parameter relating to adequacy of available resources to support the selectively disregarded at least one channel, including comparing capabilities of the user terminal equipment for displaying the selectively disregarded at least one channel on a display of the user terminal equipment and selectively accepting or denying a channel based on information relating to the capabilities of the user terminal equipment for displaying the channel on the display of the user terminal equipment;

present a notification of the selectively disregarded at least one channel of the plurality of channels, wherein the notification allows a user to access a different user terminal equipment having different capabilities more appropriate for displaying the selectively disregarded at least one channel on another display of the different user terminal equipment; and aggregate the subset of the two or more of the plurality of channels and display a set of aggregated or parsed content, wherein the processor is configured to aggregate the subset of the two or more of the plurality of channels is performed in real-time.

25. The method of claim 1, wherein the at least one selection parameter includes at least one of a rule, a policy, a user state, a time of day, or a current activity.

26. The method of claim 1, wherein comparing capabilities of the user terminal equipment includes comparing processing capabilities of the user terminal equipment.

* * * * *